US010544837B2

(12) United States Patent
Taguchi et al.

(10) Patent No.: US 10,544,837 B2
(45) Date of Patent: Jan. 28, 2020

(54) CONSTANT VELOCITY UNIVERSAL JOINT

(71) Applicant: NTN CORPORATION, Osaka (JP)

(72) Inventors: Kazuhiko Taguchi, Shizuoka (JP);
Shin Tomogami, Shizuoka (JP);
Shinichi Takabe, Shizuoka (JP)

(73) Assignee: NTN CORPORATION, Osaka (JP)

( * ) Notice: Subject to any disclaimer, the term of this patent is extended or adjusted under 35 U.S.C. 154(b) by 260 days.

(21) Appl. No.: 15/327,478

(22) PCT Filed: Jun. 24, 2015

(86) PCT No.: PCT/JP2015/068145
§ 371 (c)(1),
(2) Date: Jan. 19, 2017

(87) PCT Pub. No.: WO2016/013341
PCT Pub. Date: Jan. 28, 2016

(65) Prior Publication Data
US 2017/0175820 A1 Jun. 22, 2017

(30) Foreign Application Priority Data

Jul. 23, 2014 (JP) ................................. 2014-149852
Dec. 16, 2014 (JP) ................................. 2014-254108

(51) Int. Cl.
*F16D 3/223* (2011.01)
*F16D 3/84* (2006.01)

(52) U.S. Cl.
CPC ............. *F16D 3/223* (2013.01); *F16D 3/845* (2013.01); *F16D 3/843* (2013.01);
(Continued)

(58) Field of Classification Search
CPC . F16D 3/223; F16D 3/845; F16D 3/20; F16D 2003/22323; F16D 3/843;
(Continued)

(56) References Cited

U.S. PATENT DOCUMENTS 3,798,927 A    3/1974   Girguis
4,025,677 A * 5/1977   Belke ..................... B29C 73/00
                                                                  277/321 X (Continued)

FOREIGN PATENT DOCUMENTS

DE    27 14 983 A1 * 10/1978          ..................... 464/15
GB    2 102 915        2/1983
(Continued)

OTHER PUBLICATIONS

International Preliminary Report on Patentability and Written Opinion of the International Searching Authority dated Jan. 24, 2017 in International (PCT) Application No. PCT/JP2015/068145.
(Continued)

*Primary Examiner* — Greg Binda
(74) *Attorney, Agent, or Firm* — Wenderoth, Lind & Ponack, L.L.P.

(57) ABSTRACT

A constant velocity universal joint includes an outer joint member having an opening portion at one end thereof, and an inner joint member configured to transmit torque while allowing angular displacement with respect to the outer joint member through balls. End portions of a boot closing the opening portion of the outer joint member are fastened and fixed to a mounting part of the outer joint member and a mounting part of a shaft extending from the inner joint member. At a part of an outer peripheral surface of the shaft where at least an inner peripheral surface of the boot contacts when the shaft takes an operating angle with respect to the outer joint member, a sliding bearing is arranged to reduce abrasion due to friction caused by relative movement between the outer peripheral surface of the shaft and the inner peripheral surface of the boot.

13 Claims, 16 Drawing Sheets

(52) U.S. Cl.
CPC .............. *F16D 2003/22303* (2013.01); *F16D 2003/22326* (2013.01); *Y10S 464/905* (2013.01); *Y10S 464/906* (2013.01)

(58) Field of Classification Search
CPC . F16D 2003/22326; F16D 2003/22303; Y10S 464/905; Y10S 464/906
USPC ............................ 464/15, 175; 277/321, 636
See application file for complete search history.

(56) References Cited

U.S. PATENT DOCUMENTS

| | | | |
|---|---|---|---|
| 4,556,400 A | 12/1985 | Krüde et al. | |
| 5,419,741 A | 5/1995 | Schwärzler | |
| 8,414,406 B2 * | 4/2013 | Dine | F16D 3/845 464/906 |
| 2006/0040752 A1 * | 2/2006 | Ishijima | F16D 3/845 464/175 |
| 2011/0092297 A1 | 4/2011 | Takabe | |

FOREIGN PATENT DOCUMENTS

| | | |
|---|---|---|
| JP | 5-149346 | 6/1993 |
| JP | 5-58950 | 8/1993 |
| JP | 7-305731 | 11/1995 |
| JP | 7-305731 A * | 11/1995 |
| JP | 8-86319 | 4/1996 |
| JP | 10-122257 | 5/1998 |
| JP | 10-122257 A * | 5/1998 |
| JP | 2000-240656 | 9/2000 |
| JP | 2001-173672 | 6/2001 |
| JP | 2010-32002 | 2/2002 |
| JP | 2002-257152 | 9/2002 |
| JP | 2007-57071 | 3/2007 |
| JP | 2008-248964 | 10/2008 |
| JP | 2009-264420 | 11/2009 |

OTHER PUBLICATIONS

International Search Report dated Sep. 8, 2015 in International (PCT) Application No. PCT/JP2015/068145.
Extended European Search Report dated Mar. 29, 2018 in corresponding European Patent Application No. 15824214.9.

* cited by examiner

CONSTANT VELOCITY UNIVERSAL JOINT

TECHNICAL FIELD

The present invention relates to a constant velocity universal joint, which is to be mounted to a power transmission system for an automobile or various types of industrial machines, e.g., a drive shaft or a propeller shaft of an automobile, and which includes a boot configured to prevent entry of a foreign matter from outside the joint and leakage of a lubricant from inside the joint.

BACKGROUND ART

Constant velocity universal joints to be used as, for example, means for transmitting a rotational force from an engine of an automobile to wheels at constant velocity are classified into such two types as a fixed type constant velocity universal joint and a plunging type constant velocity universal joint. The two types of constant velocity universal joints have structure capable of transmitting rotational torque at constant velocity even when two shafts, namely, a drive shaft and a driven shaft are coupled to each other to form an operating angle.

A drive shaft configured to transmit power from an engine of an automobile to a driving wheel needs to cope with angular displacement and axial displacement due to a change in relative positional relationship between the engine and the wheel. Therefore, in general, a plunging type constant velocity universal joint configured to allow both the angular displacement and the axial displacement is mounted on an engine side (inboard side), and a fixed type constant velocity universal joint configured to allow only the angular displacement is mounted to a driving wheel side (outboard side). The both constant velocity universal joints are connected to each other with a shaft.

As illustrated in FIG. 15, the fixed type constant velocity universal joint includes an outer joint member 123, an inner joint member 126, a plurality of balls 127, and a cage 128. The outer joint member 123 has a plurality of track grooves 122 formed in a radially inner surface 121 at equal intervals in a circumferential direction and along an axial direction. The inner joint member 126 has a plurality of track grooves 125 formed in a radially outer surface 124 at equal intervals in a circumferential direction and along the axial direction to be paired with the track grooves 122 of the outer joint member 123. The plurality of balls 127 are interposed between the track grooves 122 of the outer joint member 123 and the track grooves 125 of the inner joint member 126 and configured to transmit torque. The cage 128 is interposed between the radially inner surface 121 of the outer joint member 123 and the radially outer surface 124 of the inner joint member 126 and configured to retain the balls 127.

Further, a female spline 129 is formed in a radially inner surface of a shaft hole of the inner joint member 126, and a male spline 131 is formed in an end portion of a shaft 130 to be fitted into the shaft hole of the inner joint member 126. Thus, when the end portion of the shaft 130 is fitted into the shaft hole of the inner joint member 126, the female spline 129 of the inner joint member 126 and the male spline 131 of the shaft 130 are fitted so that torque can be transmitted. A circlip 132 is mounted to the end portion of the shaft 130. With this, the shaft 130 is prevented from being coming off. The outer joint member 123 includes a mouth section 123a having the plurality of track grooves 122 formed in the radially inner surface 121 and a stem section (shaft section) 123b projecting from a bottom wall of the mouth section 123a.

As illustrated in FIG. 16, the plunging type constant velocity universal joint includes an outer joint member 141, a tripod member 143, and rollers 144. The outer joint member 141 has three track grooves 140 being formed along an inner periphery thereof and extending in an axial direction and has roller guide surfaces 140a respectively opposed to inner walls of the track grooves 140. The tripod member 143 has three journal 142 and serves as an inner joint member. The rollers 144 are rotatably supported by the journal 142 and rollably placed in the track grooves 140 of the outer joint member 141, and serve as torque transmission units. In this case, the rollers 144 are externally fitted through interposition of a plurality of rollers 145 arranged on radially outer surfaces of the journal 142 along a circumferential direction.

The outer joint member 141 includes a mouth section 141a and a stem section 141b, which are integrally formed. The mouth section 141a has a cup shape which is opened at one end thereof. The three track grooves 140 extending in the axial direction are formed in a radially inner surface of the mouth section 141a. The tripod member 143 includes a boss 146 and the journal 142. The journal 142 project radially at three equiangular positions in the circumferential direction of the boss.

A female spline 148 is formed in a radially inner surface of the boss 146. An end portion of the shaft 150 on the inboard side is inserted to the boss 146, and a male spline 149 formed in the end portion of the shaft 150 is fitted to the female spline 148 of the boss 146. With this, the shaft 150 and the tripod member 143 are fitted to each other so that torque can be transmitted. A circlip 152 is mounted to the end portion of the shaft 150. With this, the shaft 150 is prevented from coming off.

In the fixed type constant velocity universal joint or the plunging type constant velocity universal joint, in order to prevent leakage of a lubricant such as grease sealed inside the joint and to prevent entry of a foreign matter from outside the joint, in general, a boot 160 made of rubber or resin is mounted between the outer joint member 123 (141) of the constant velocity universal joint and the shaft 130 (150) extending from the inner joint member 126 (143) to close an opening portion of the outer joint member 123 (141) with the boot 160.

As illustrated in FIG. 15 and FIG. 16, the boot 160 includes a large-diameter end portion 160a, a small-diameter end portion 160b, and a bellows portion 160c. The large-diameter end portion 160a is fastened and fixed by a boot clamp 161 to an outer peripheral surface of the opening portion of the outer joint member 123 (141) of the constant velocity universal joint. The small-diameter end portion 160b is fastened and fixed by a boot clamp 162 to an outer peripheral surface of the shaft 130 (150) extending from the inner joint member 126 (143) of the constant velocity universal joint. The bellows portion 160c connects the large-diameter end portion 160a and the small-diameter end portion 160b. The bellows portion 160c has peak portions and root portions which are formed alternately and continuously and is reduced in diameter from the large-diameter end portion 160a to the small-diameter end portion 160b so as to be expandable and contractible.

The constant velocity universal joint has a function to rotate while taking an operation angle. Further, the plunging type constant velocity universal joint has a function to rotate while sliding in the axial direction. Therefore, various proposals have hitherto been made in order to secure durability, such as abrasion resistance and fatigue resistance, of the boot.

Specifically, in order to suppress abrasion in the boot, various measures have been taken in related-art constant velocity universal joints. For example, an inner diameter of the root portions of the boot is increased. As in Patent Literature 1, the inner peripheral surfaces of the root portions of the boot are formed into a shape which achieves high resistance against abrasion. As in Patent Literature 2, the surface roughness of the outer peripheral surface of the shaft is reduced.

Further, as in Patent Literature 3, a component for reducing abrasion or abnormal sound is added to a material of the boot. As in Patent Literature 4, on a surface of the boot made of a diene-based rubber material, a synthetic resin containing polytetrafluoroethylene powder is arranged as a discontinuous coating. According to Patent Literature 4, such discontinuous coating is arranged to stably achieve a low friction property and abrasion resistance in the surface.

Further, according to Patent Literature 5, the bellows portion is divided into a portion closer to a large-diameter mounting part, a portion closer to a small-diameter mounting part, and a center portion, and the rigidities of those parts are differentiated. Specifically, the relationship of the rigidities of the parts is set to be the center portion>the portion closer to the large-diameter mounting part>the portion closer to the small-diameter mounting part. Further, according to Patent Literature 6, the diameter of the mountain portion and the diameter of the root portion are limited.

CITATION LIST

Patent Literature 1: JP 2007-57071 A
Patent Literature 2: JP 2010-32002 A
Patent Literature 3: JP 2001-173672 A
Patent Literature 4: JP 8-86319 A
Patent Literature 5: JP 2002-257152 A
Patent Literature 6: JP 5-149346 A

SUMMARY OF INVENTION

Technical Problem

Incidentally, there has been an increasing demand for reduction in size and weight of an automobile and various industrial machines, and a compact design is also demanded with respect to the boot for the constant velocity universal joint. On the contrary, when the inner diameter of the root portions of the boot is increased as described above as a measure for suppressing abrasion which may occur in the inner peripheral surfaces of the root portions of the boot, there is a fear in that the weight of the joint is increased and that interference with peripheral parts of the joint occurs. Therefore, such increase in inner diameter may not be a practical measure.

Further, when the constant velocity universal joint takes an operating angle or slides, the boot is deformed to follow the movement. At a phase in a direction of taking the operating angle (hereinafter referred to as "contraction side"), when a high operating angle is taken, inner surfaces of the root portions are more liable to be brought into contact with the shaft. Typically, the outer peripheral surface of the shaft has a lead surface formed by turning. Therefore, when the inner peripheral surfaces of the root portions of the bellows portion are brought into contact with the outer peripheral surface of the shaft, abrasion is more liable to occur in the inner peripheral surfaces of the root portions of the bellows portion. As a result, the durability of the boot is degraded, and lifetime of the boot is shortened.

However, any of the constant velocity universal joints disclosed in Patent Literature 1 and Patent Literature 2 cannot avoid the contact of the inner peripheral surfaces of the root portions of the boot with respect to the outer peripheral surface of the shaft. When the constant velocity universal joint is rotated while the operating angle is taken, the inner peripheral surfaces of the root portions of the boot and the outer peripheral surface of the shaft may have relative movement in the axial direction and in the circumferential direction. Thus, friction may occur between the inner peripheral surfaces of the root portions of the boot and the outer peripheral surface of the shaft. The friction may cause the abrasion in the inner peripheral surfaces of the root portions of the boot. Further, in order to reduce the surface roughness of the outer peripheral surface of the shaft, surface processing with respect to the shaft is required, which may cause difficulty in reducing cost.

According to the disclosure in Patent Literature 3, improvement in abrasion resistance and reduction in abnormal sound can be expected. However, it does not provide a sufficient measure for the interference and friction between the root portions of the boot bellows portion and the shaft, and rather causes degradation in fatigue resistance or aging resistance and degradation in the sealing property at the large-diameter end portion and the small-diameter end portion.

Further, according to the description in Patent Literature 4, even when such discontinuous coating is applied to an inner surface of the boot, there is difficulty in obtaining sufficient abrasion resistance in the inner surfaces of the root portions. In Patent Literature 5 and Patent Literature 6, elaborated boot shapes have been proposed. However, in any of those cases, the measure for improvement of the abrasion resistance in the inner surfaces of the root portions is not sufficient, and the compactness of the entire boot is poor.

The present invention has been proposed in view of the above-mentioned problems, and has an object to provide a constant velocity universal joint which may reliably suppress abrasion in an inner peripheral surface of a boot due to a contact between the inner peripheral surface of the boot and an outer peripheral surface of a shaft.

Solution to Problem

As a technical measure to achieve the above-mentioned object, according to one embodiment of the present invention, there is provided a constant velocity universal joint, comprising: an outer joint member having an opening portion at one end thereof; an inner joint member configured to transmit torque while allowing angular displacement with respect to the outer joint member through a torque transmission member; a boot closing the opening portion of the outer joint member, the boot having end portions which are fastened and fixed to a mounting part of the outer joint member and a mounting part of a shaft member extending from the inner joint member; and an intermediate member configured to reduce abrasion due to friction caused by relative movement between an outer peripheral surface of the shaft member and an inner peripheral surface of the boot, the intermediate member being arranged at a part of the outer peripheral surface of the shaft member where at least the inner peripheral surface of the boot is brought into contact when the shaft member takes an operating angle with respect to the outer joint member. Here, the relative movement is a relative movement in an axial direction and in the circumferential direction of the constant velocity universal joint.

According to the present invention, the intermediate member configured to reduce abrasion due to friction caused by the relative movement between the outer peripheral surface of the shaft member and the inner peripheral surface of the boot is arranged at a part of the outer peripheral surface of the shaft member where at least the inner peripheral surface of the boot is brought into contact when the shaft member takes the operating angle with respect to the outer joint member. With this, the friction caused by the relative movement between the outer peripheral surface of the shaft member and the inner peripheral surface of the boot is distributed, thereby being capable of reducing the friction in the inner peripheral surface of the boot. As a result, the abrasion caused by the friction in the inner peripheral surface of the boot can be suppressed.

It is desired that the intermediate member according to the present invention, which is configured to reduce the abrasion due to the friction caused by the relative movement, comprise a sliding bearing. With such configuration, the intermediate member configured to reduce the friction can be constructed with a simple unit. In this case, with the interposition of the sliding bearing between the inner peripheral surface of the boot and the outer peripheral surface of the shaft member, the inner peripheral surface of the boot slides with respect to the outer peripheral surface of the sliding bearing, and the inner peripheral surface of the sliding bearing slides with respect to the outer peripheral surface of the shaft member. Therefore, the amount of relative movement between the inner peripheral surface of the boot and the outer peripheral surface of the sliding bearing can be set smaller than the amount of relative movement between the inner peripheral surface of the boot and the outer peripheral surface of the shaft member. That is, the friction of the boot with respect to the sliding bearing can be set smaller than the friction of the boot with respect to the shaft member, thereby being capable of reliably suppressing the abrasion in the inner peripheral surface of the boot caused by the friction.

It is desired that the intermediate member according to the present invention, which is configured to reduce the abrasion due to the friction caused by the relative movement, comprise a plurality of sliding bearings independently arranged next to each other along the axial direction. With such configuration, a contact area per sliding bearing with respect to the outer peripheral surface of the shaft member is reduced. Thus, the sliding bearing becomes more likely to slide on the outer peripheral surface of the shaft member. Therefore, the amount of relative movement between the inner peripheral surface of the boot and the outer peripheral surface of the sliding bearing can be further reduced. Further, even when the inner peripheral surface of the boot is brought into contact at a plurality of locations, the respective sliding bearings independently slide on the outer peripheral surface of the shaft member. Therefore, the amount of relative movement of the inner peripheral surface of the boot with respect to the sliding bearing can be further suppressed.

It is desired that the intermediate member according to the present invention, which is configured to reduce the abrasion due to the friction caused by the relative movement, be formed of a cylindrical member configured to cover the outer peripheral surface of the shaft member, and that the cylindrical member as a pair of end portions, which are capable of being joined to each other, be formed along the axial direction at least at one location of the cylindrical member in the circumferential direction. With such configuration, the intermediate member configured to reduce the friction caused by the relative movement can easily be assembled to the shaft member. That is, the pair of end portions are joined to each other under a state in which the shaft member is received in the cylindrical member having the pair of end portions separated apart, and then assembly of the cylindrical member with respect to the shaft member can be completed.

The intermediate member configured to reduce the friction caused by the relative movement may be formed of the cylindrical member configured to cover the outer peripheral surface of the shaft member, and the cylindrical member may be movable with respect to the shaft member in the circumferential direction and in the axial direction.

It is desired that the cylindrical member have an axial slit formed between both axial ends thereof.

The cylindrical member can be increased in diameter so that an inner diameter dimension thereof is set larger than a maximum outer diameter dimension at the shaft end part of the shaft member. Further, the cylindrical member can be increased in diameter so that a width dimension of the axial slit in the circumferential direction becomes larger than the outer diameter dimension at the part of the shaft member where the inner peripheral surface of the boot is brought into contact. When the cylindrical member is to be mounted to the part where the inner peripheral surface of the boot is brought into contact, the cylindrical member may be reduced in diameter to the inner diameter dimension enabling the movement with respect to the shaft member in the circumferential direction and in the axial direction. The cylindrical member may have the inner diameter dimension set smaller than the part where the inner peripheral surface of the boot is brought into contact. When the cylindrical member is to be mounted to the part where the inner peripheral surface of the boot is brought into contact, the cylindrical member may be increased in diameter to the inner diameter enabling the movement with respect to the shaft member in the circumferential direction and the axial direction.

It is desired that a lubricant sealed inside the joint be interposed between the inner peripheral surface of the cylindrical member and the outer peripheral surface of the shaft member.

Advantageous Effects of Invention

According to the present invention, the intermediate member configured to reduce the abrasion due to the friction caused by the relative movement (in the axial direction and in the circumferential direction) between the outer peripheral surface of the shaft member and the inner peripheral surface of the boot is arranged at a part of the outer peripheral surface of the shaft member where at least the inner peripheral surface of the boot is brought into contact when the shaft member takes the operating angle with respect to the outer joint member. With this, the friction caused by the relative movement between the outer peripheral surface of the shaft member and the inner peripheral surface of the boot is distributed. Therefore, the friction in the inner peripheral surface of the boot can be reduced, thereby being capable of suppressing the abrasion caused by the friction in the inner peripheral surface of the boot. As a result, the constant velocity universal joint exhibiting excellent durability and long lifetime can be achieved.

DESCRIPTION OF EMBODIMENTS

A constant velocity universal joint according to embodiments of the present invention is hereinafter described in detail. In the following embodiment, a Rzeppa type constant velocity universal joint being a fixed type constant velocity universal joint which allows only angular displacement is exemplified. However, in addition to the Rzeppa type constant velocity universal joint, the present invention is also applicable to other fixed type constant velocity universal joint, e.g., an undercut-free type constant velocity universal joint. Further, the present invention is also applicable to the plunging type constant velocity universal joints such as the tripod type, cross-groove type, and double offset type constant velocity universal joints which allow both the angular displacement and the axial displacement. The present invention is applicable to constant velocity universal joints to be mounted to a drive shaft and a propeller shaft of an automobile.

Figure 1:
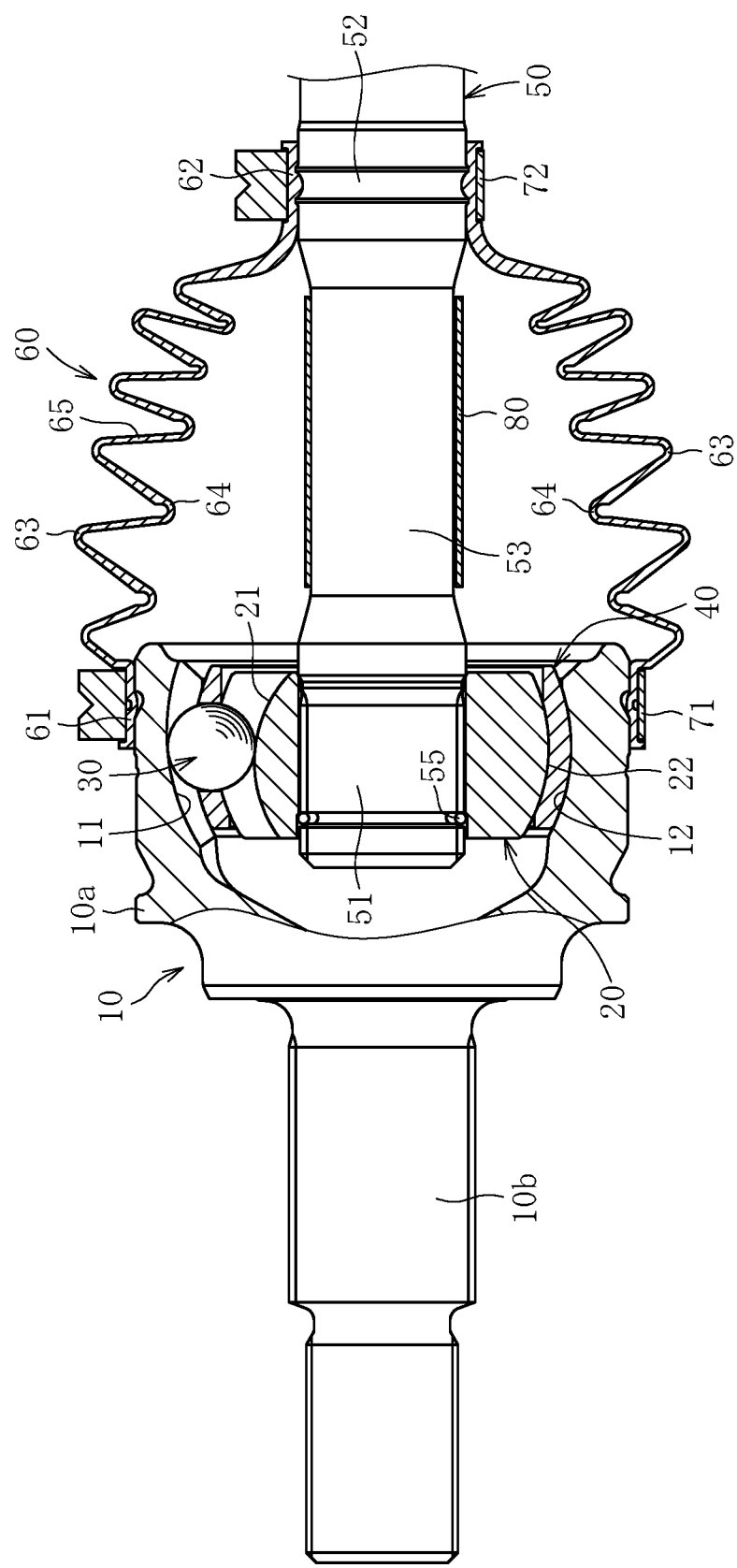
FIG. 1 is a sectional view for illustrating a constant velocity universal joint under a state in which an operating angle is 0° according to a first embodiment of the present invention.

FIG. 1 is an illustration of a constant velocity universal joint under a state in which an operating angle is 0° according to a first embodiment. The constant velocity universal joint comprises, as main components, an outer joint member 10, an inner joint member 20, a plurality of balls 30, and a cage 40. The outer joint member 10 has a cup shape. Track grooves 11 having an arc shape and extending in an axial direction are formed in a spherical inner peripheral surface 12 at a plurality of locations in a circumferential direction. The inner joint member 20 has track grooves 21 each having an arc shape. The track grooves 21 are formed in a spherical outer peripheral surface 22 at a plurality of locations in the circumferential direction and paired with the track grooves 11 of the outer joint member 10 to extend in the axial direction. The balls 30 are interposed between the track grooves 11 of the outer joint member 10 and the track grooves 21 of the inner joint member 20 and serve as torque transmission members. The cage 40 is arranged between the spherical inner peripheral surface 12 of the outer joint member 10 and the spherical outer peripheral surface 22 of the inner joint member 20 and configured to retain the balls 30 with pockets formed at equal intervals in the circumferential direction.

In this constant velocity universal joint, a shaft end part 51 of a shaft 50 being a shaft member is connected to a shaft hole of the inner joint member 20 through spline fitting so that torque can be transmitted. The constant velocity universal joint of this type has structure in which a bellows boot 60 made of, for example, resin or rubber is mounted between the outer joint member 10 and the shaft 50 in order to prevent leakage of a lubricant, e.g., grease sealed inside the joint and to prevent entry of a foreign matter from outside the joint. A circlip 55 is mounted to an end portion of the shaft 50 to prevent the shaft 50 from coming off. The outer joint member 10 comprises a mouth section 10a and a stem section (shaft section) 10b. The mouth section 10a has the plurality of track grooves 11 formed in a radially inner surface. The stem section 10b projects from a bottom wall of the mouth section 10a.

Through sealing of the lubricant (not shown) in an internal space of the outer joint member 10 and the boot 60, during the operation of rotating the shaft 50 while taking an operating angle with respect to the outer joint member 10, lubricity is secured at sliding parts inside the joint, that is, sliding parts at components comprising the outer joint member 10, the inner joint member 20, the balls 30, and the cage 40.

The above-mentioned boot 60 comprises a large-diameter end portion 61, a small-diameter end portion 62, and a bellows portion 65. The large-diameter end portion 61 is fastened and fixed by a boot clamp 71 to an outer peripheral surface of an opening portion being a mounting part of the outer joint member 10. The small-diameter end portion 62 is fastened and fixed by a boot clamp 72 to an outer peripheral surface of a mounting part 52 of the shaft 50 extending from the inner joint member 20. The bellows portion 65 connects the large-diameter end portion 61 and the small-diameter end portion 62. The bellows portion 65 has peak portions 63 and root portions 64, which are formed alternately and continuously, and is reduced in diameter from the large-diameter end portion 61 to the small-diameter end portion 62 so as to be expandable and contractible.

Further, the shaft 50 described above comprises the shaft end part 51, the mounting part 52, and the intermediate part 53. The shaft end part 51 is press-fitted to the shaft hole of the inner joint member 20. The mounting part 52 bears the small-diameter end portion 62 of the boot 60 fastened and fixed thereto. The intermediate part 53 is located between the shaft end part 51 and the mounting part 52. The intermediate part 53 of the shaft 50 has an outer diameter smaller than outer diameters of the shaft end part 51 and the mounting part 52, and has a smooth outer peripheral surface extending along the axial direction. The bellows portion 65 of the boot 60 is arranged on the outer side of the intermediate part 53 of the shaft 50.

Figure 2:
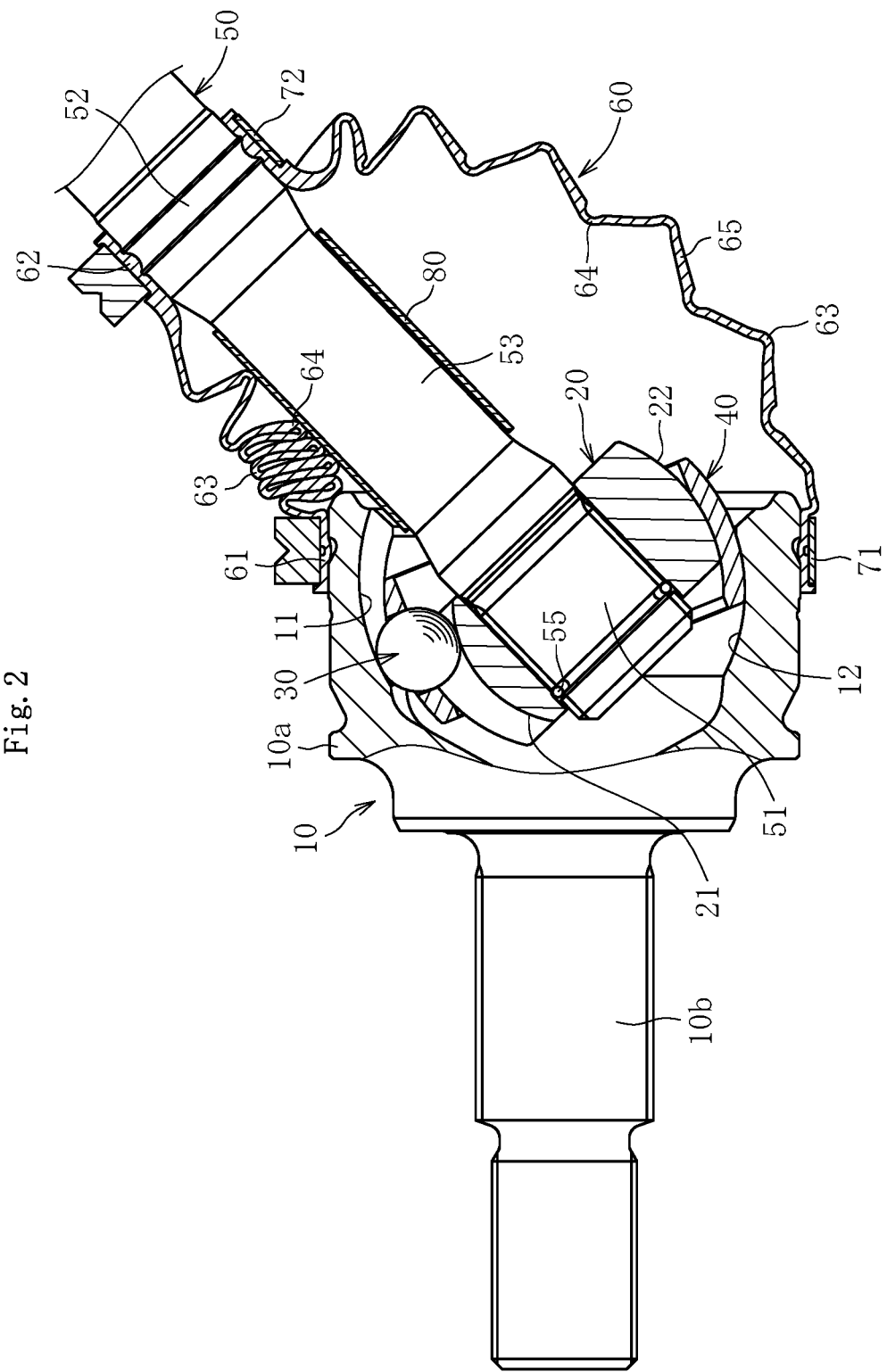
FIG. 2 is a sectional view for illustrating a state in which the constant velocity universal joint of FIG. 1 takes an operating angle.

FIG. 2 is an illustration of a state in which the constant velocity universal joint takes an operating angle. As illustrated in FIG. 2, when the constant velocity universal joint takes the operating angle, one side of the boot 60 (upper side in FIG. 2) is compressed. Thus, on the one side, the inner peripheral surfaces of the root portions 64 of the bellows portion 65 become more liable to be brought into contact with the outer peripheral surface of the shaft 50. In particular, there is relative movement between the inner peripheral surfaces of the root portions 64 of the bellows portion 65 and the outer peripheral surface of the shaft 50 (see FIG. 1). Therefore, friction is generated between the inner peripheral surfaces of the root portions 64 of the bellows portion 65 and the outer peripheral surface of the shaft 50.

In view of the above, according to this embodiment, in order to suppress abrasion generated in the inner peripheral surfaces of the root portions 64 of the bellows portion 65 of the boot 60 due to the friction, there is provided an intermediate member, which is configured to reduce the abrasion due to the friction caused by the relative movement between the inner peripheral surfaces of the root portions 64 of the bellows portion 65 and the outer peripheral surface of the intermediate part 53 of the shaft 50, at a part of the outer peripheral surface of the shaft 50 where at least the inner peripheral surfaces of the root portions 64 of the bellows portion 65 are brought into contact, that is, at the outer peripheral surface of the intermediate part 53 of the shaft 50 when the constant velocity universal joint takes the operating angle.

As the intermediate member configured to reduce the friction caused by the relative movement, a sliding bearing 80 is effective because the intermediate member configured to reduce the friction caused by the relative movement can be constructed with a simple unit. The sliding bearing 80 is mounted to extend over a substantially entire length of the intermediate part 53 of the shaft 50 so as to cover the intermediate part 53. Further, the sliding bearing 80 is mounted under a state in which a clearance is formed with respect to the intermediate part 53 of the shaft 50. Thus, co-rotation with the shaft 50 can be avoided. When the sliding bearing 80 is made of resin having a self-lubricating property, the abrasion in the inner peripheral surfaces of the root portions 64 of the bellows portion 65 can easily be reduced. Further, a coating film may be formed on the outer peripheral surface of the sliding bearing 80. The formation of the coating film is effective because the abrasion due to the contact between the outer peripheral surface of the sliding bearing 80 and the inner peripheral surfaces of the root portions 64 of the bellows portion 65 is suppressed.

The material forming the sliding bearing 80, for example, resin having the self-lubricating property may comprise polyimide, polyamide-imide, polyetheretherketone (PEEK), a fluororesin (tetrafluoroethylene), a fluororesin-based elastomer (fluororubber), polyphenylene sulfide, polyoxymethylene, polyamide, polyethylene, and the like. The material of the sliding bearing 80 may be a material other than the resin having the self-lubricating property. However, when metal or the like having a hardness higher than that of resin is to be used, it is desired to form the coating film on the outer peripheral surface of the sliding bearing 80 to suppress the abrasion.

With the sliding bearing 80 having the above-mentioned configuration mounted to the intermediate part 53 of the shaft 50, when the constant velocity universal joint takes the operating angle, the inner peripheral surfaces of the root portions 64 of the bellows portion 65 of the boot 60 are not brought into direct contact with the outer peripheral surface of the intermediate part 53 of the shaft 50 which is hardened by quenching. That is, the sliding bearing 80 is interposed between the inner peripheral surfaces of the root portions 64 of the bellows portion 65 and the outer peripheral surface of the intermediate part 53 of the shaft 50. With this, even though the inner peripheral surfaces of the root portions 64 of the bellows portion 65 on the one side of the boot 60 are brought into contact with the outer peripheral surface of the sliding bearing 80, the inner peripheral surfaces of the root portions 64 of the bellows portion 65 slide with respect to the outer peripheral surface of the sliding bearing 80, and the inner peripheral surface of the sliding bearing 80 slides with respect to the outer peripheral surface of the intermediate part 53 of the shaft 50.

Therefore, the amount of relative movement between the inner peripheral surfaces of the root portions 64 of the bellows portion 65 and the outer peripheral surface of the sliding bearing 80 can be set smaller than the amount of relative movement between the inner peripheral surfaces of the root portions 64 of the bellows portion 65 and the outer peripheral surface of the intermediate part 53 of the shaft 50. That is, the friction of the boot 60 with respect to the sliding bearing 80 can be set smaller than the friction of the boot 60 with respect to the shaft 50. Thus, the abrasion in the inner peripheral surfaces of the root portions 64 of the bellows portion 65 due to the friction can reliably be suppressed. As described above, through use of the sliding bearing 80, the abrasion in the root portions 64 of the bellows portion 65 is not affected by the surface roughness of the outer peripheral surface of the intermediate part 53 of the shaft 50, and surface processing with respect to the shaft 50 is not required.

Herein, when a maximum contact surface pressure between the inner peripheral surfaces of the root portions 64 of the bellows portion 65 of the boot 60 and the outer peripheral surface of the sliding bearing 80 is P [MPa], and a sliding velocity of the boot 60 with respect to the sliding bearing 80 is V [mm/s], it is preferred that a PV value, which is obtained by multiplying the maximum contact surface pressure P by the sliding speed V, be 3,000 [MPa·mm/s] or less. Through setting of the PV value to 3,000 or less, the abrasion in the inner peripheral surfaces of the root portions 64 of the bellows portion 65 can be suppressed (amount of abrasion is less than 0.05 mm). When the PV value is larger than 3,000, there is difficulty in obtaining a desired abrasion-suppressing effect.

Figure 3:
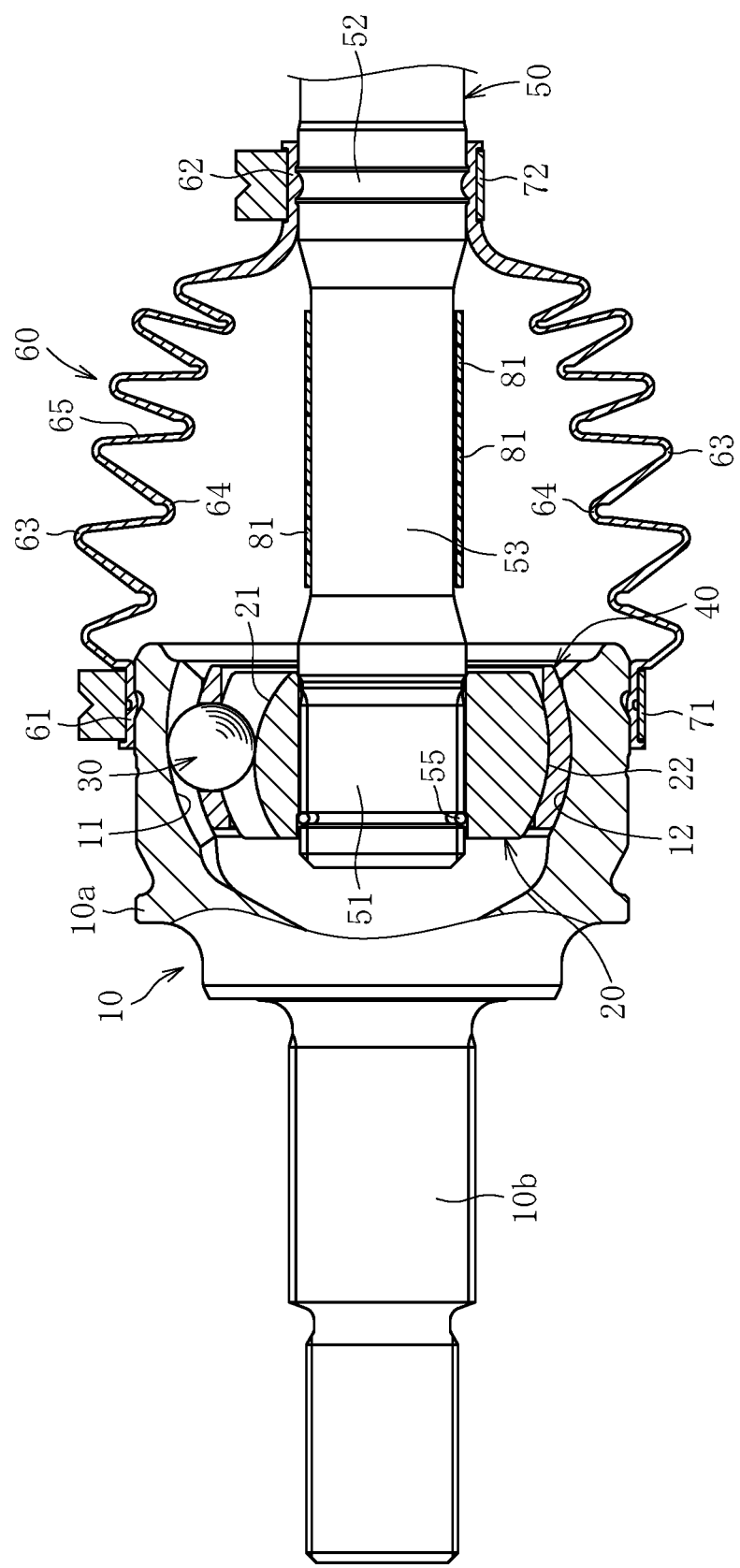
FIG. 3 is a sectional view for illustrating a constant velocity universal joint under the state in which the operating angle is 0° according to a second embodiment of the present invention.
Figure 4:
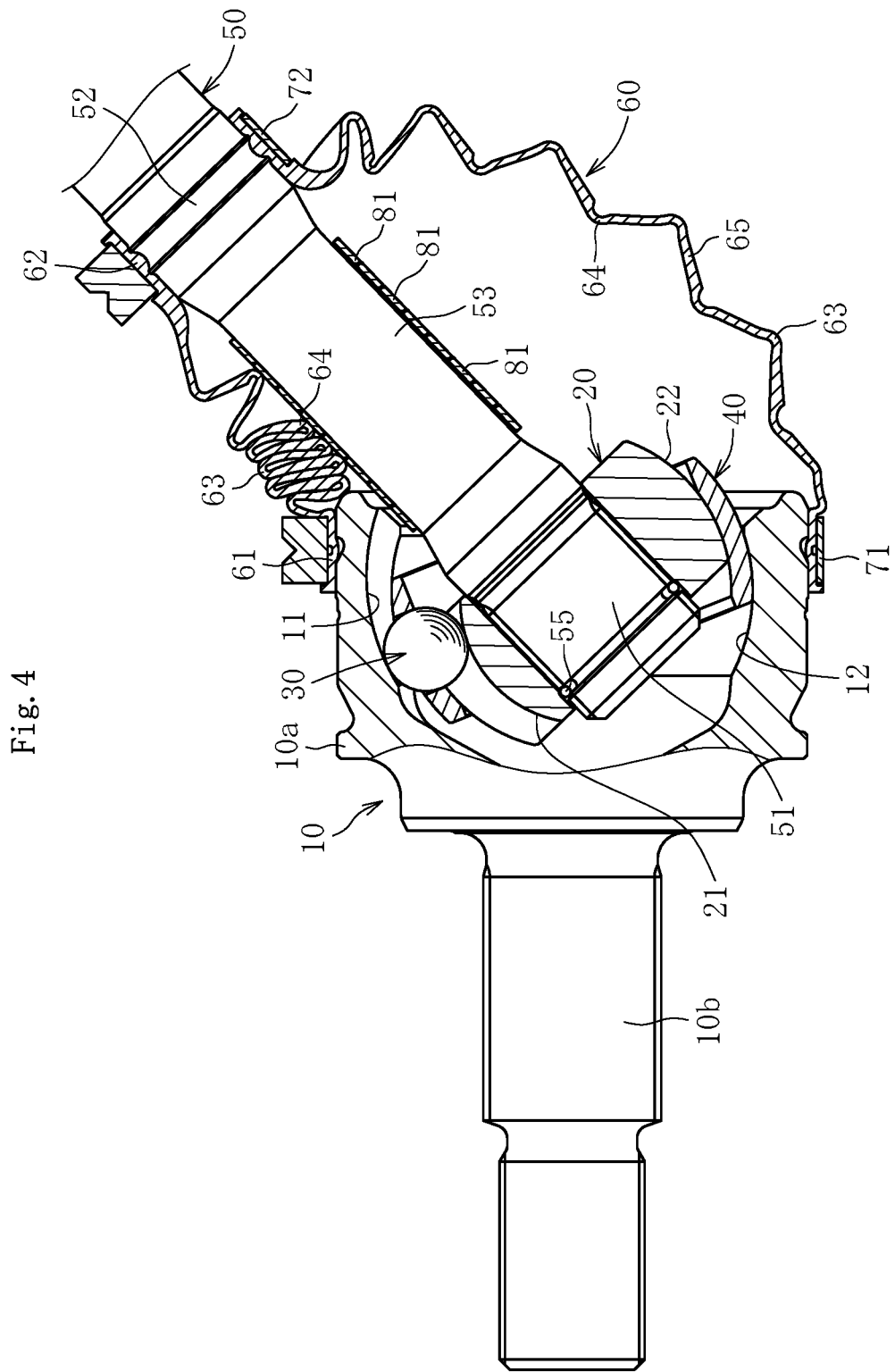
FIG. 4 is a sectional view for illustrating a state in which the constant velocity universal joint of FIG. 3 takes the operating angle.

The constant velocity universal joint of FIG. 1 and FIG. 2 has structure in which one sliding bearing 80 is arranged on the outer peripheral surface of the intermediate part 53 of the shaft 50. However, as in a constant velocity universal joint illustrated in FIG. 3 and FIG. 4 according to a second embodiment of the present invention, a plurality of sliding bearings 81 may be arranged on the outer peripheral surface of the intermediate part 53 of the shaft 50. Those sliding bearings 81 are independently arranged next to each other along the axial direction on the outer peripheral surface of the intermediate part 53 of the shaft 50. The material, function, and actions and effects of the sliding bearings 81 are the same as those of the one sliding bearing 80 used in the constant velocity universal joint of FIG. 1 and FIG. 2, and hence redundant description thereof is omitted.

Through use of the plurality of sliding bearings 81 as described above, the contact area per sliding bearing with respect to the outer peripheral surface of the intermediate part 53 of the shaft 50 is reduced. Thus, the sliding bearing 81 becomes more likely to slide on the outer peripheral surface of the intermediate part 53 of the shaft 50. Therefore, the friction caused by the relative movement between the inner peripheral surfaces of the root portions 64 of the bellows portion 65 of the boot 60 and the outer peripheral surface of the sliding bearing 81 can further be reduced. Further, even when the inner peripheral surfaces of the root portions 64 of the bellows portion 65 are brought into contact at a plurality of locations, the sliding bearings 81 independently slide on the outer peripheral surface of the intermediate part 53 of the shaft 50. Thus, the friction caused by the relative movement of the inner peripheral surfaces of the root portions 64 of the bellows portion 65 with respect to the sliding bearings can further be suppressed.

Figure 5:
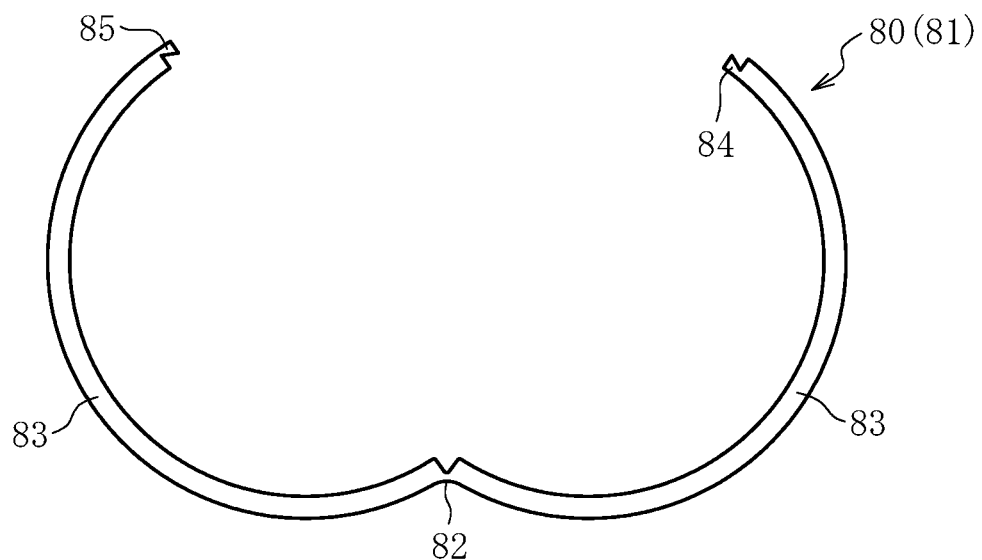
FIG. 5 is a side view for illustrating an example of structure of a sliding bearing.
Figure 7:
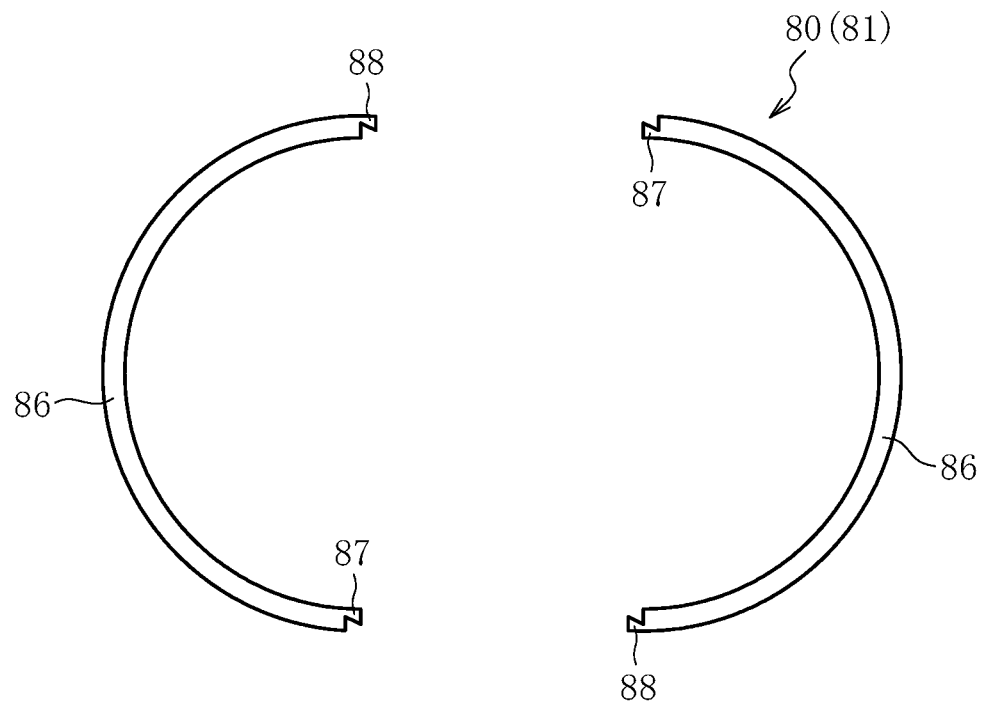
FIG. 7 is a side view for illustrating another example of the structure of the sliding bearing.

The sliding bearings 80 and 81 to be used for the constant velocity universal joints illustrated in FIG. 1 to FIG. 4 may have structure in which a pair of end portions that can be joined to each other (engagement portions 84 and 85 described later) formed at least at one location in the circumferential direction thereof to extend along the axial direction as illustrated in FIG. 5 and FIG. 7. With such structure, the sliding bearings 80 or 81 can easily be mounted to the intermediate part 53 of the shaft 50.

The sliding bearing 80 or 81 of FIG. 5 is an example in which the end portions that can be joined to each other are arranged at one location. The sliding bearing 80 or 81 has structure in which two half-split parts 83 connected to each other by a connecting portion 82 are openable and closable, and in which engagement portions 84 and 85 that can be joined to each other are formed at the respective end portions of the half-split parts 83. The connecting portion 82 has a cut in an inner periphery thereof to allow the two half-split parts 83 to be openable and closable. One engagement portion 84 has a radially inner side projecting in the circumferential direction and has a shape with a thickness that increases from a base end to a distal end. Another engagement portion 85 has a radially outer side projecting in the circumferential direction and has a shape with a thickness that increases from a base end to a distal end.

Figure 6:
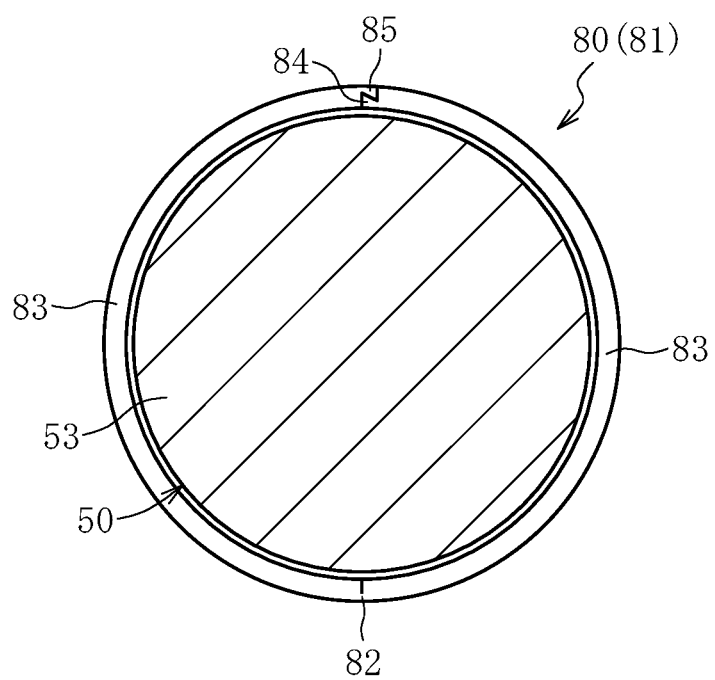
FIG. 6 is a side view for illustrating a state in which the sliding bearing of FIG. 5 is mounted to a shaft.

With the sliding bearing 80 or 81 having the above-mentioned structure, the intermediate part 53 of the shaft 50 is received inside thereof under a state in which the two half-split parts 83 are opened. Then, as illustrated in FIG. 6, one engagement portion 84 and another engagement portion 85 are joined to each other. Thus, assembly to the intermediate part 53 of the shaft 50 is completed. Each of one engagement portion 84 and another engagement portion 85 has a shape with a thickness that increases from the base end to the distal end. Thus, the engagement portions 84 and 85 are prevented from being disengaged after assembly, thereby being capable of maintaining a state of being rigidly joined to each other.

The sliding bearing 80 or 81 of FIG. 7 is an example in which the end portions that can be joined to each other are arranged at two locations, and has structure in which engagement portions 87 and 88 are formed at each of both end portions of two half-split parts 86 which are independently separated. One engagement portion 87 of each of the half-split parts 86 has a radially inner side projecting in the circumferential direction and has a shape with a thickness that increases from a base end to a distal end. Another engagement portion 88 has a radially outer side projecting in the circumferential direction and has a shape with a thickness that increases from a base end to a distal end.

Figure 8:
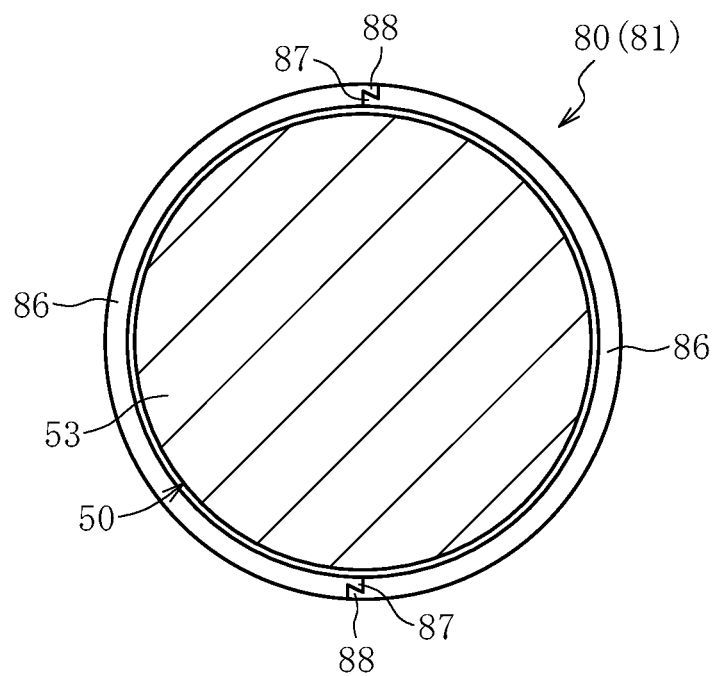
FIG. 8 is a side view for illustrating a state in which the sliding bearing of FIG. 7 is mounted to the shaft.

With the sliding bearing 80 or 81 having the above-mentioned structure, the intermediate part 53 of the shaft 50 is arranged between the two half-split parts 86. Then, as illustrated in FIG. 8, the engagement portions 87 and 88 located at both end portions of one half-split part 86 and the engagement portions 87 and 88 located at both end portions of another half-split part 86 are joined to each other. Thus, assembly to the intermediate part 53 of the shaft 50 is completed. Each of one engagement portion 87 and another engagement portion 88 has a shape with a thickness that increases from the base end to the distal end. Thus, the engagement portions 87 and 88 are prevented from being disengaged after assembly, thereby being capable of maintaining a state of being rigidly joined to each other.

In the above-mentioned embodiments, description is made on the case where the sliding bearing 80 or 81 is used as the intermediate member configured to reduce the friction caused by the relative movement. However, the present invention is not limited thereto. As another intermediate member configured to reduce the friction caused by the relative movement, a rolling bearing can also be used.

Figure 9:
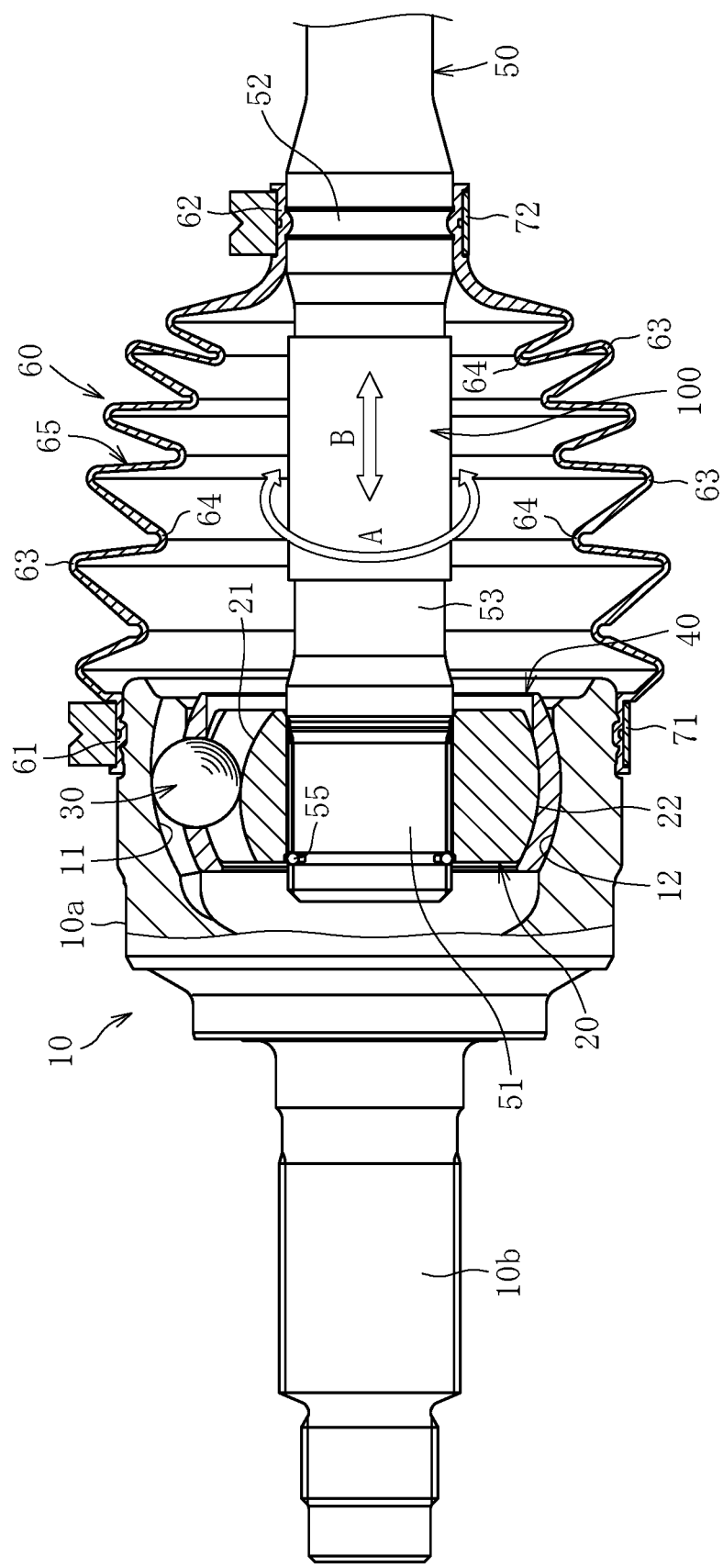
FIG. 9 is a sectional view for illustrating a constant velocity universal joint under the state in which the operating angle is 0° according to a third embodiment of the present invention.

Next, FIG. 9 is an illustration of a third embodiment of the present invention. In this case, the intermediate member configured to reduce the friction caused by the relative movement comprises a cylindrical member 100 configured to cover the outer peripheral surface of the shaft 50 being the shaft member. The cylindrical member 100 is movable with respect to the shaft 50 in the circumferential direction (direction of the arrow A) and in the axial direction (direction of the arrow B).

Figure 10:
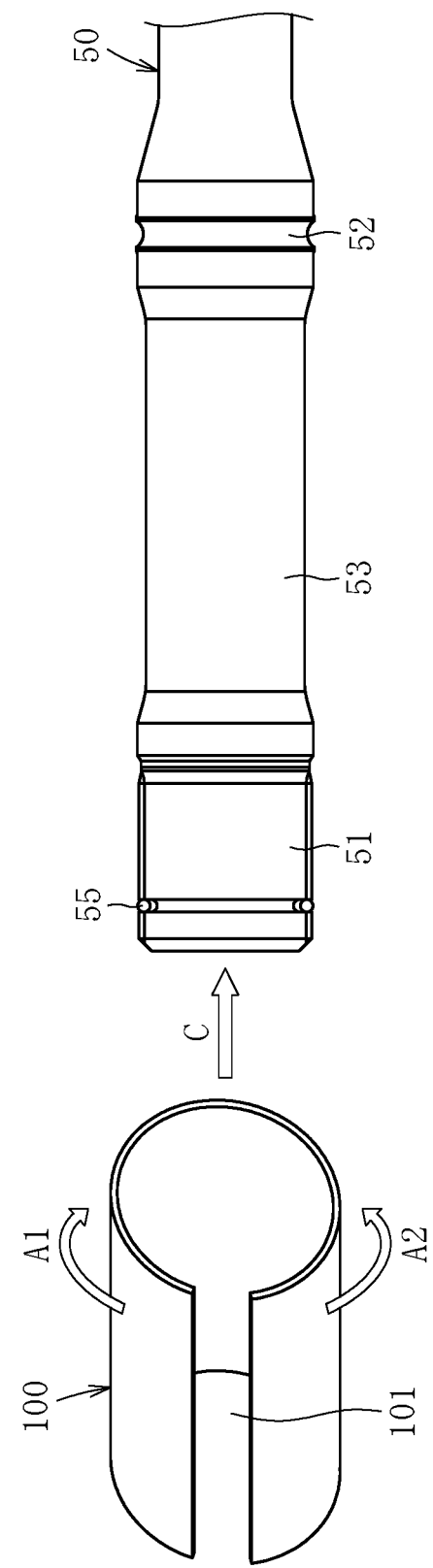
FIG. 10 is a side view for illustrating a method of mounting a cylindrical member of FIG. 9 to the shaft.

As illustrated in FIG. 10, the cylindrical member 100 has a straight slit 101 extending along the axial direction to reach both axial ends thereof. That is, the cylindrical member 100 has a circular cross-sectional shape in which a cutout portion is formed in part. Therefore, the cylindrical member 100 is increased in diameter by increasing a width dimension of the slit 101, and then is fitted to the intermediate part 53 of the shaft 50.

Specifically, the slit 101 is widened as indicated by the arrows A1 and A2 of FIG. 10 to increase an inner diameter dimension of the cylindrical member 100 to be larger than the outer diameter dimension of the shaft end part 51 of the shaft 50. In this state, as indicated by the arrow C, the cylindrical member 100 is fitted to the intermediate part 53 of the shaft 50 through the shaft end part 51 of the shaft 50. Alternatively, the slit 101 may further be widened to increase the circumferential width of the slit 101 to be larger than the diameter of the intermediate part 53 of the shaft 50. With this, the cylindrical member 100 is fitted to the intermediate part 53 of the shaft 50. In this fitted state, a diameter-increasing force applied to the cylindrical member 100 is released. With this, a restoring force of the cylindrical member 100 reduces the diameter to be restored to the diameter in a free state. Further, it is not always necessary that the cylindrical member 100 be restored to the original diameter after releasing the diameter-increasing force under a state of being increased in diameter to be larger than the outer diameter dimension of the shaft end part 51 of the shaft 50. It is only necessary that the cylindrical member 100 be restored to the free state of conforming to the intermediate part 53 of the shaft 50 through application of a diameter-reducing force under a state of being fitted to the intermediate part 53.

The inner diameter dimension of the cylindrical member 100 in the free state is set larger than the outer diameter dimension of the intermediate part 53 of the shaft 50 by approximately from 0.1 mm to 1 mm. Further, the axial length of the cylindrical member 100 is set smaller than that of the intermediate part 53, and is set to a dimension that allows the amount of sliding of the root portions 64 of the bellows portion 65 of the boot 60 along the axis center direction in contact with the cylindrical member 100 when the constant velocity universal joint is rotated while taking any operating angle.

The material of the cylindrical member 100 may be metal, resin, or rubber. However, the inner diameter of the cylindrical member 100 is increased when the cylindrical member 100 is mounted to the shaft 50, and hence the material needs to have a property of allowing deformation and enabling restoration, after mounting, to the dimension satisfying the above-mentioned conditions for mounting to the shaft 50. As the metal, there may be used iron or aluminum. With the cylindrical member 100 made of metal, there is difficulty in increasing the diameter when the thickness is excessively large. Thus, there is a fear in that the operability in restoration to the original free state may be degraded or in that unnecessary partial deformation may occur in the cylindrical member 100, which is not desired. Therefore, in the case of using iron or aluminum, the thickness is set to from 0.01 mm to 0.5 mm.

In the case of using resin or rubber, a degree of freedom in the thickness dimension is higher than that in the case of using metal. However, when the thickness dimension is set larger, the operating angle which may cause the start of contact with the root portions 64 of the boot 60 becomes smaller. Therefore, the influence on the deformation state and fatigue of the boot 60 is concerned. Thus, in the case of using resin or rubber, it is preferred that the thickness dimension be 1 mm or less. As the material of resin, there may be applied thermosetting resin, thermoplastic resin, thermoplastic elastomer, or the like. However, the thermoplastic resin or thermoplastic elastomer is desired in consideration of mountability to the shaft 50. In the case of the thermoplastic resin, even when a hard material is selected, mounting to the shaft 50 can be performed under a state in which the material is softened through heating. In the case of the thermoplastic elastomer, mounting to the shaft 50 can easily be performed at normal temperature. Further, as the rubber, a generally known material such as diene-based rubber or non-diene-based rubber can be used.

Figure 17:
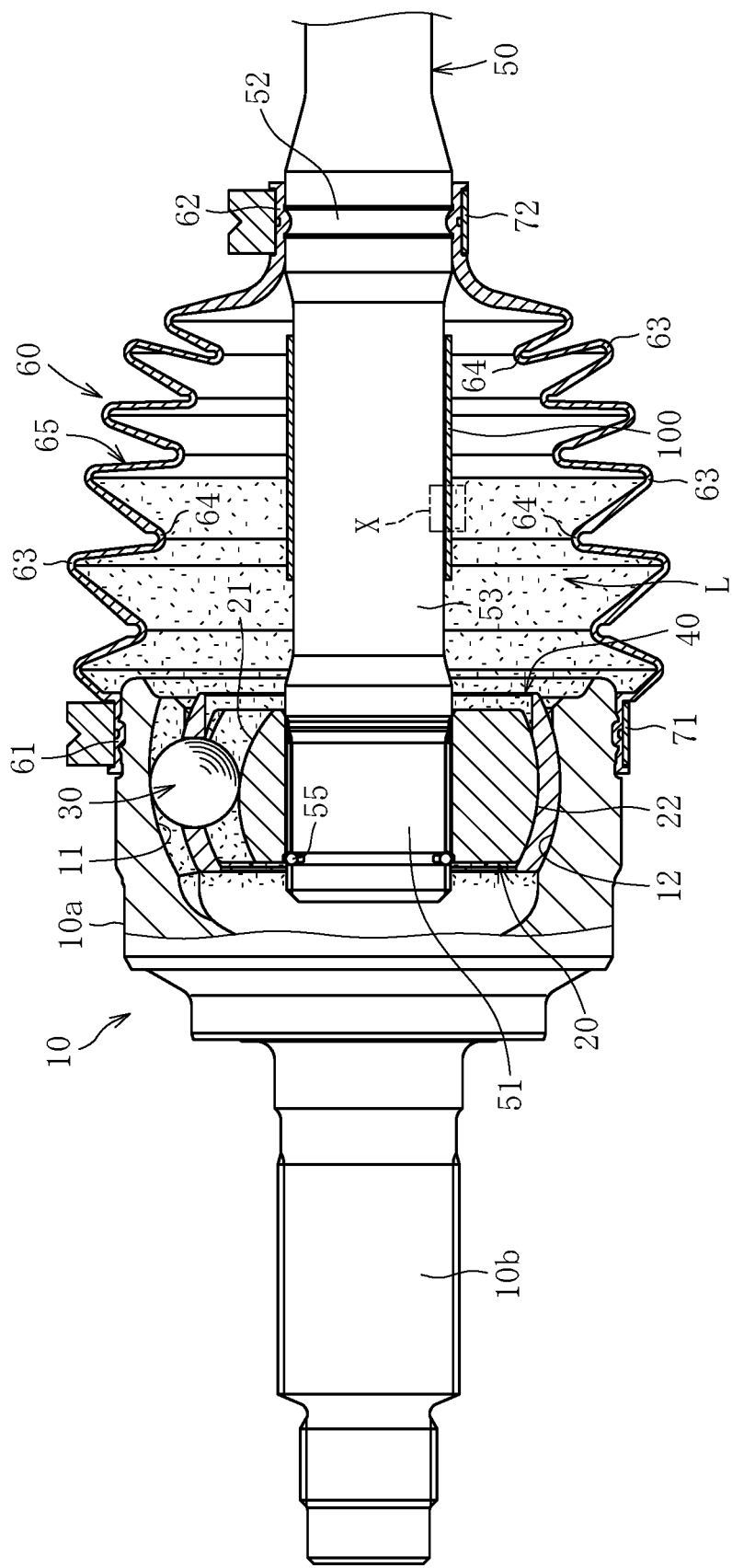
FIG. 17 is a sectional view for illustrating a constant velocity universal joint including a cylindrical member 100 and lubricant L.
Figure 18:
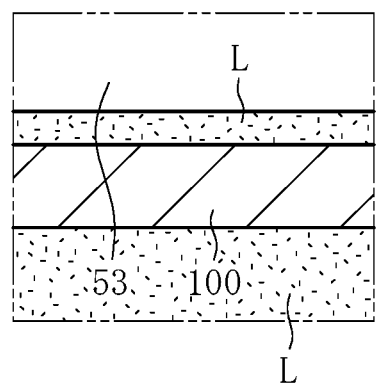
FIG. 18 is the magnified view of portion X in FIG. 17.

Further, as illustrated in FIG. 17 and FIG. 18, a lubricant (grease) L for lubrication is sealed in the constant velocity universal joint. In this case, as described above, the inner diameter dimension of the cylindrical member 100 is set larger than the outer diameter dimension of the intermediate part 53 by approximately from 0.1 mm to 1 mm. Thus, a slight clearance is formed between the shaft 50 and the cylindrical member 100, and the grease L is interposed in the clearance.

Figure 11:
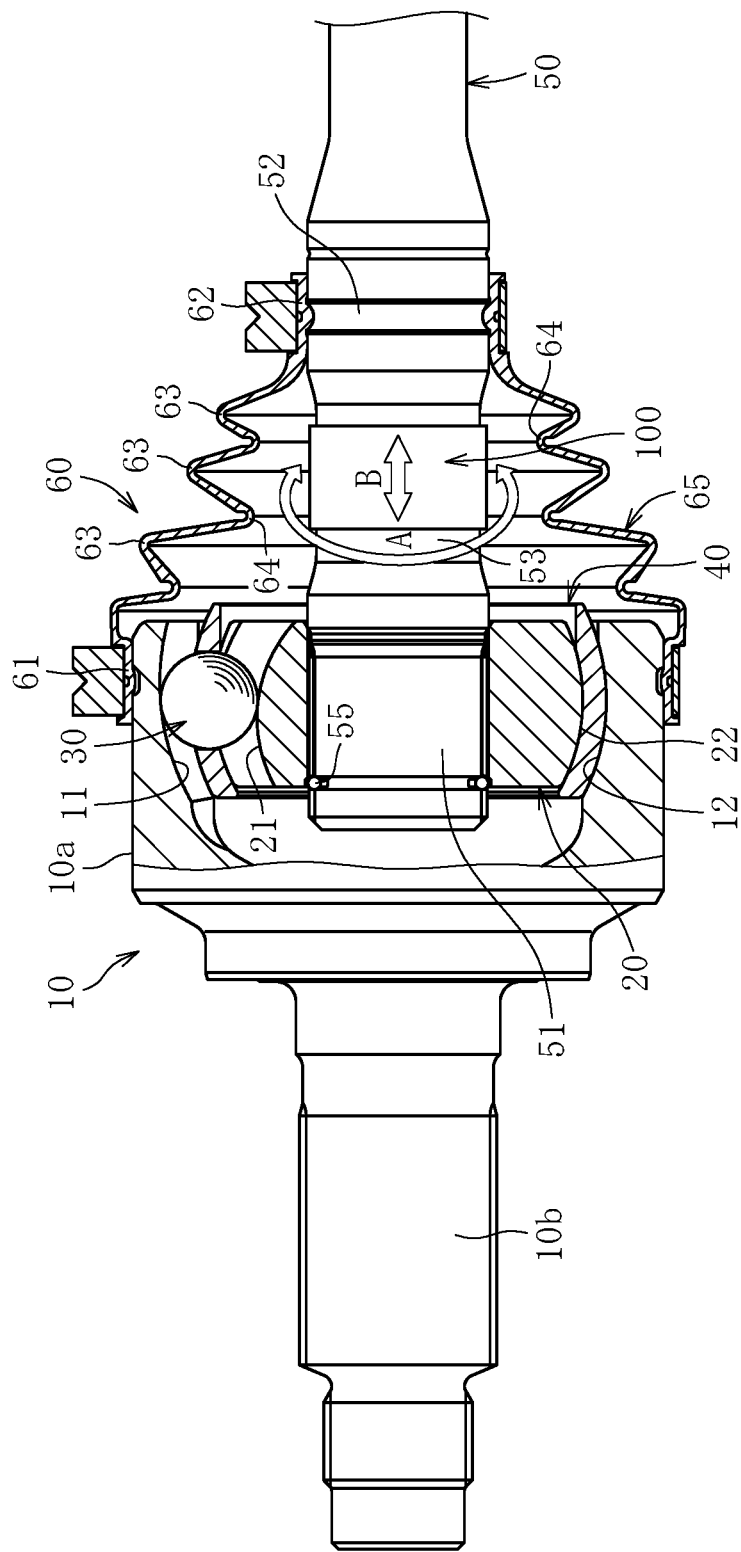
FIG. 11 is a sectional view for illustrating a constant velocity universal joint under the state in which the operating angle is 0° according to a fourth embodiment of the present invention.

Next, in FIG. 11, the axial length of the intermediate part 53 of the shaft 50 is set smaller, which is different from the constant velocity universal joint illustrated in FIG. 9. In this case, the axial length of the boot 60 to be mounted is set smaller. That is, the bellows portion 65 of the boot 60 illustrated in FIG. 9 comprises six peak portions 63 and five root portions 64, whereas the bellows portion 65 of the boot 60 illustrated in FIG. 11 comprises four peak portions 63 and three root portions 64.

Therefore, the cylindrical member 100 is formed of a short cylindrical body to correspond to the axial length of the intermediate part 53 of the shaft 50. Also in this case, the width dimension of the slit 101 (see FIG. 10) is increased to increase the cylindrical member 100 in diameter, and the cylindrical member 100 is fitted to the intermediate part 53 of the shaft 50. Further, the inner diameter dimension of the cylindrical member 100 in the free state is set larger than the outer diameter dimension of the intermediate part 53 of the cylindrical member 100 by approximately from 0.1 mm to 1 mm. Thus, the cylindrical member 100 is movable with respect to the shaft in the circumferential direction (direction of the arrow A) and in the axial direction (direction of the arrow B).

Figure 12:
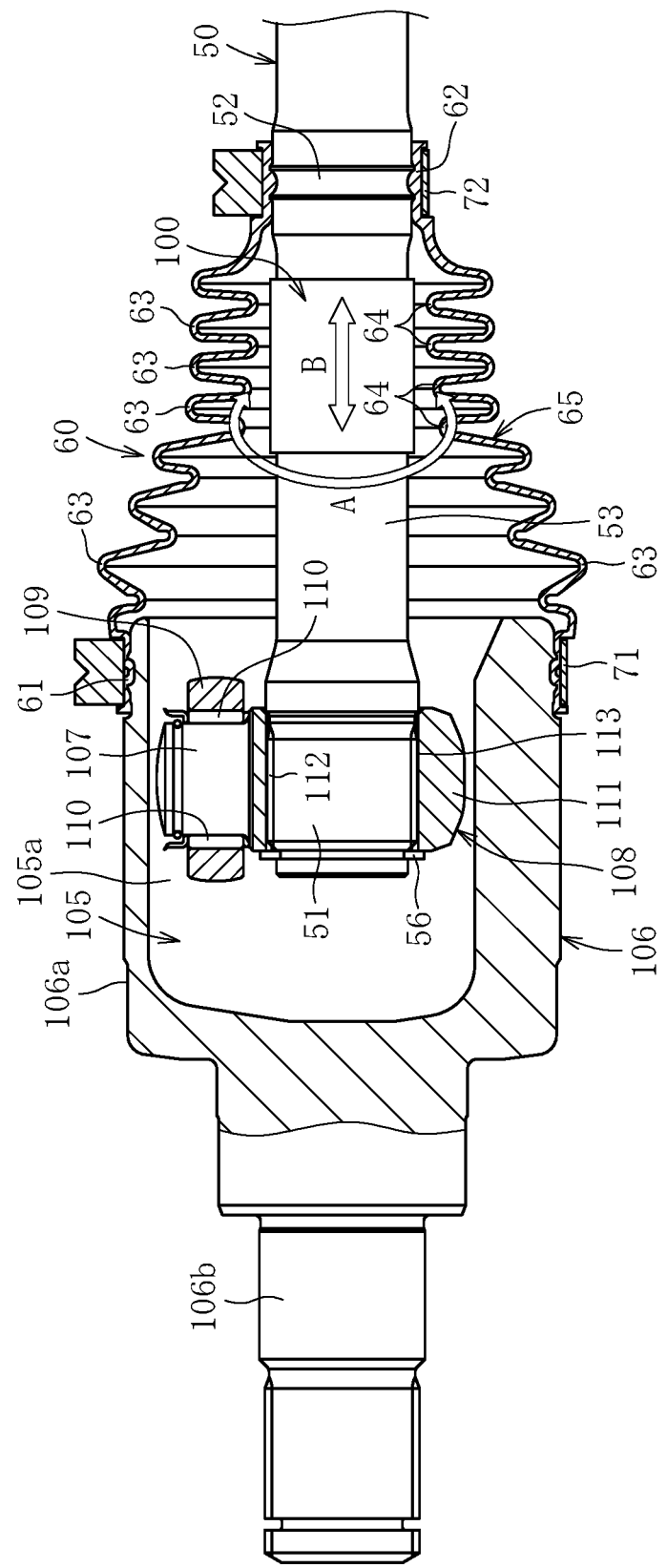
FIG. 12 is a sectional view for illustrating a constant velocity universal joint under the state in which the operating angle is 0° according to a fifth embodiment of the present invention.

Next, FIG. 12 is an illustration of a plunging type constant velocity universal joint of a tripod type as the constant velocity universal joint. The plunging type constant velocity universal joint comprises an outer joint member 106, a tripod member 108, and rollers 109. The outer joint member 106 has three track grooves 105 being formed along an inner periphery thereof and extending in the axial direction and has roller guide surfaces 105a respectively opposed to inner walls of the track grooves 105. The tripod member 108 has three journal 107 and serves as an inner joint member. The rollers 109 are rotatably supported by the journal 107 and rollably placed in the track grooves 105 of the outer joint member 106 and serve as torque transmission units. In this case, the rollers 109 are externally fitted through interposition of a plurality of rollers 110 arranged on radially outer surfaces of the journal 107 along the circumferential direction.

The outer joint member 106 comprises a mouth section 106a and a stem section 106b, which are integrally formed. The mouth section 106a has a cup shape which is opened at one end thereof. The three track grooves 105 extending in the axial direction are formed in a radially inner surface of the mouth section 106a. The tripod member 108 comprises a boss 111 and the journal 107. The journal 107 project radially at three equiangular positions in the circumferential direction of the boss 111.

A female spline 112 is formed in a radially inner surface of the boss 111. An end portion of the shaft 50 is inserted to the boss 111, and a male spline 113 formed in the end portion of the shaft 50 is fitted to the female spline 112 of the boss 111. With this, the shaft 50 and the tripod member 108 are connected to each other so that torque can be transmitted. A circlip 56 is mounted to the end portion of the shaft 50. With this, the shaft 50 is prevented from coming off.

Also in this case, the bellows portion 65 of the boot 60 comprises eight peak portions 63 and seven root portions 64. Further, four root portions 64 on the small-diameter end portion 62 side are arranged close to the intermediate part 53 of the shaft 50. Thus, the cylindrical member 100 to be externally fitted to the intermediate part 53 of the shaft 50 has the axial length corresponding to those four root portions 64.

Also in this case, the inner diameter dimension of the cylindrical member 100 in the free state is set larger than the outer diameter dimension of the intermediate part 53 of the shaft 50 by approximately from 0.1 mm to 1 mm. Thus, the cylindrical member 100 is movable with respect to the shaft in the circumferential direction (direction of the arrow A) and in the axial direction (direction of the arrow B).

Figure 13:
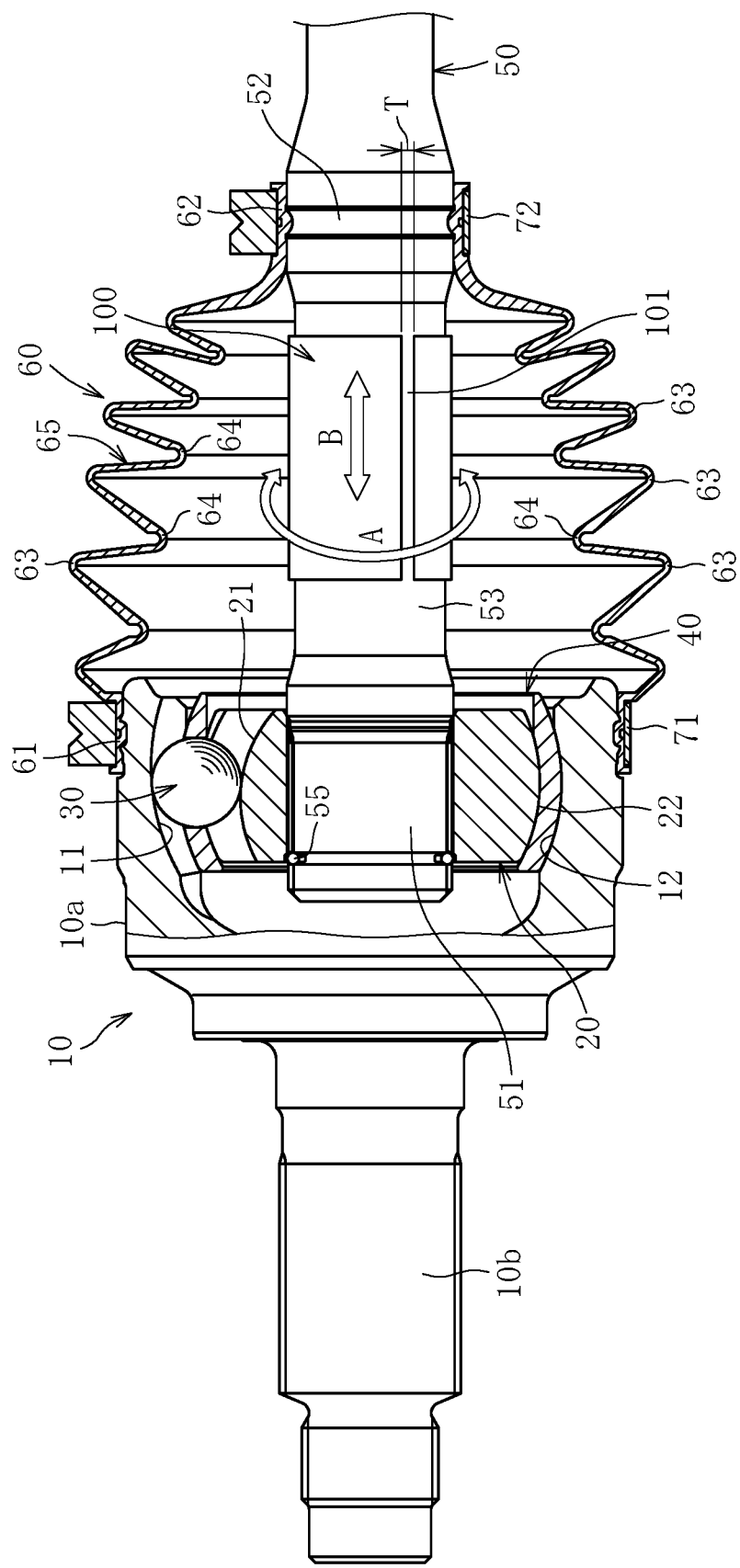
FIG. 13 is a sectional view for illustrating a constant velocity universal joint under the state in which the operating angle is 0° according to a sixth embodiment of the present invention.
Figure 14A:
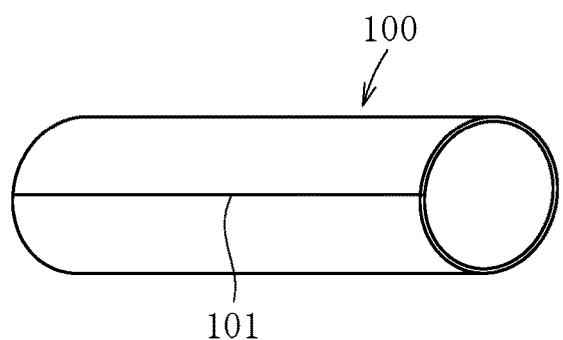
FIG. 14A is a schematic perspective view for illustrating a cylindrical member having a slit extending along an axial center direction.
Figure 14B:
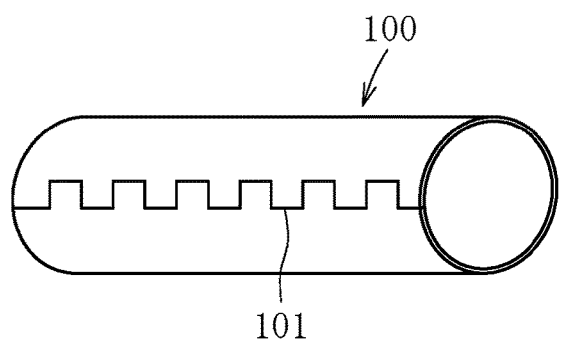
FIG. 14B is a schematic perspective view for illustrating a cylindrical member having the slit with a convex and concave fitting teeth shape.
Figure 14C:
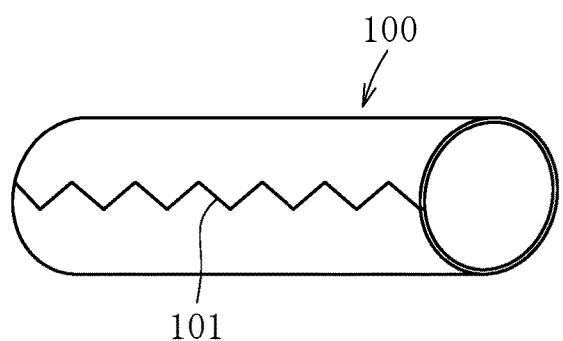
FIG. 14C is a schematic perspective view for illustrating a cylindrical member having a slit with a triangular teeth shape.
Figure 14D:
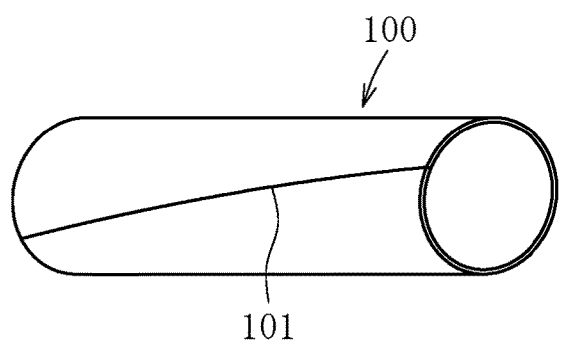
FIG. 14D is a schematic perspective view for illustrating a cylindrical member having the slit with a shape inclined with respect to the axial center direction.
Figure 14E:
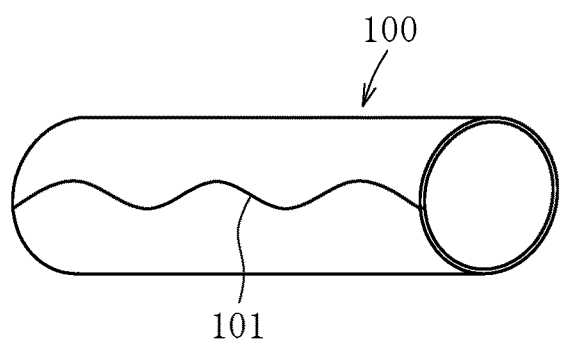
FIG. 14E is a schematic perspective view for illustrating a cylindrical member having the slit with a waveform teeth shape.
Figure 14F:
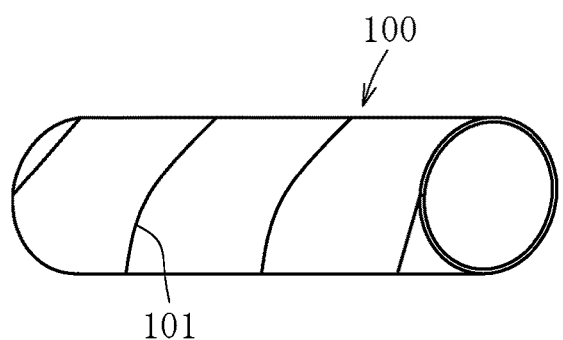
FIG. 14F is a schematic perspective view for illustrating the cylindrical member formed by spirally winding a belt-like body.
Figure 15:
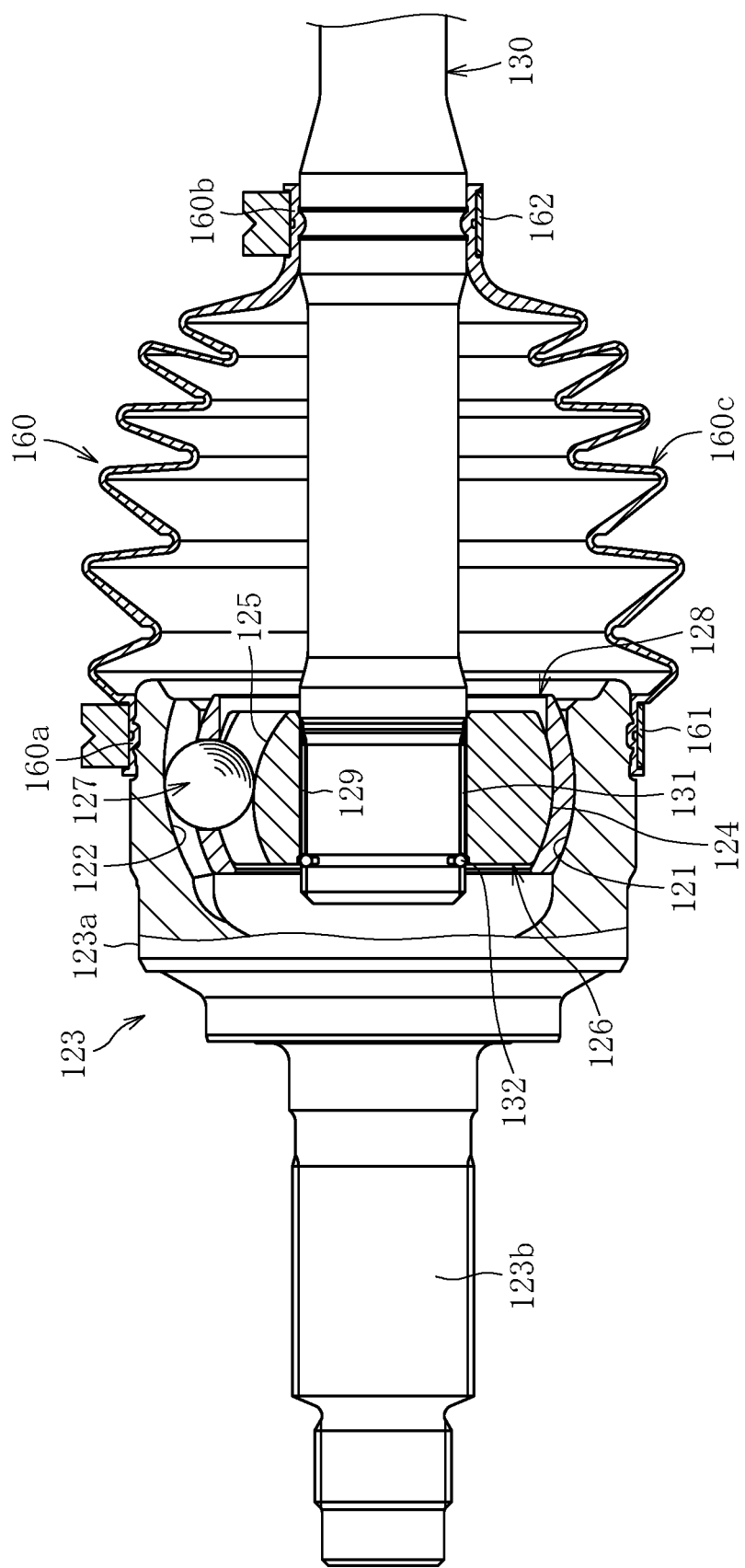
FIG. 15 is a sectional view for illustrating a related-art fixed type constant velocity universal joint.
Figure 16:
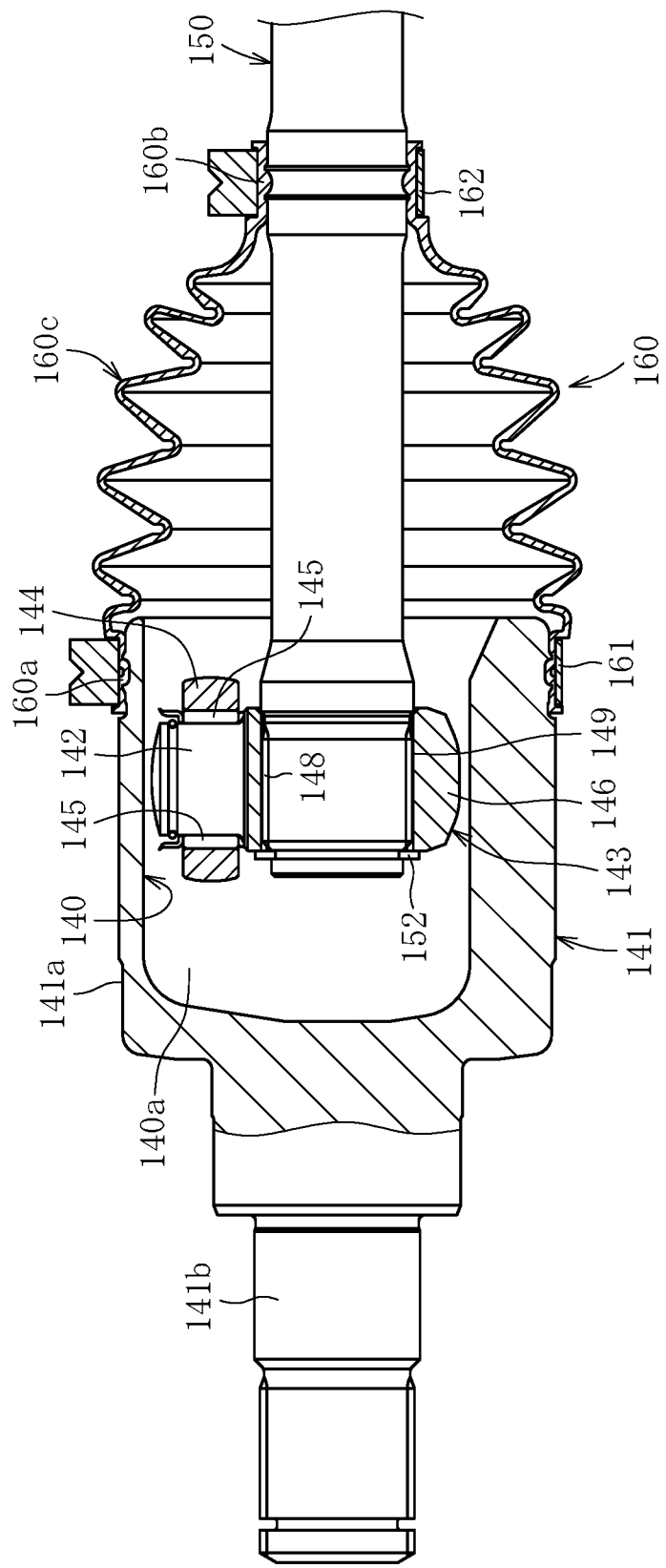
FIG. 16 is a sectional view for illustrating a related-art plunging type constant velocity universal joint.

Next, in the illustration of FIG. 13, there is formed a slit 101 having a predetermined width dimension T under a state in which the cylindrical member 100 is mounted. In this case, in a state before the cylindrical member 100 is mounted to the intermediate part 53 of the shaft 50, the inner diameter dimension thereof may be set smaller than the outer diameter dimension of the intermediate part 53 of the shaft 50 or set larger by approximately from 0.1 mm to 1 mm.

When the cylindrical member 100 is to be mounted to the intermediate part 53 of the shaft 50, the cylindrical member 100 is increased in diameter and fitted to the intermediate part 53 of the shaft 50. Also in this case, the cylindrical member 100 is movable with respect to the shaft 50 in the circumferential direction (direction of the arrow A) and in the axial direction (direction of the arrow B). Further, the grease L enters through the slit 101 to be interposed between the intermediate part 53 of the shaft 50 and the cylindrical member 100. The inner diameter dimension of the cylindrical member 100 in the mounted state is set equal to the outer diameter dimension of the intermediate part 53 of the shaft 50 or set larger by approximately from 0.1 mm to 1 mm. However, even when the inner diameter dimension of the cylindrical member 100 is set equal to the outer diameter dimension of the intermediate part 53 of the shaft 50, it may be substantially slightly larger because the grease L is interposed between the cylindrical member 100 and the intermediate part 53.

When the width dimension (clearance dimension) T of the slit 101 is excessively large, there is a fear in that the root portions 64 of the boot 60 are brought into contact with the shaft 50 through the slit 101. Therefore, it is preferred that the width dimension (clearance dimension) T of the slit 101 be set to 2 mm or less.

Incidentally, various types of the cylindrical member 100 can be proposed as illustrated in FIG. 14. FIG. 14A is an illustration of the slit 101 with a straight shape formed along the axial direction as in FIG. 10. FIG. 14B is an illustration of the slit 101 with a convex and concave fitting teeth shape. FIG. 14C is an illustration of the slit 101 with a triangular teeth shape. FIG. 14D is an illustration of the slit 101 with a shape inclined with respect to the axial direction and curved. FIG. 14E is an illustration of the slit 101 with a waveform teeth shape. FIG. 14F is an illustration of the cylindrical member formed by spirally winding a belt-like body. In FIG. 14F, the slit 101 is formed with a spiral shape.

As illustrated in FIG. 9, FIG. 11, FIG. 12, and FIG. 13, as long as the cylindrical member 100 is movable with respect to the shaft member in the circumferential direction and in the axial direction, even when the operating angle is taken, and the root portions 64 of the boot 60 are brought into contact with the cylindrical member 100, the cylindrical member 100 moves on the shaft 50 along with the movement of the root portions 64. Therefore, the root portions 64 of the boot 60 are prevented from being abraded. When the cylindrical member 100 is not arranged, the root portions 64 of the boot 60 are brought into contact with the shaft 50 and moves relative to the shaft 50, which results in abrasion.

That is, when the root portions 64 of the boot 60 are to be brought into contact with the shaft 50, there may be employed a shape design with the outer diameter of the boot 60 being significantly reduced while improving the abrasion resistance and securing the boot durability with effective utilization of properties such as the fatigue resistance, the aging resistance, or the like being inherent to the boot material. With such effect, while the boot durability is maintained, compactification of the boot 60 can be achieved, and the inner volume of the boot 60 can be reduced. As a result, a constant velocity universal joint can be obtained which has less amount of grease to be sealed in the boot 60.

Further, with regard to the cylindrical members 100 illustrated in FIG. 9, FIG. 11, FIG. 12, and FIG. 13, the axial slit 101 is formed to extend between both axial ends. Therefore, the cylindrical member 100 can easily be increased or reduced, thereby enabling quick and reliable operations of mounting and removing.

The cylindrical member 100 can be increased in diameter so that the inner diameter dimension thereof is set larger than the maximum outer diameter dimension of the shaft member (shaft 50). When the cylindrical member 100 is to be mounted to the part (intermediate part 53 of the shaft 50) where the inner peripheral surface (root portions 64) of the boot 60 is brought into contact, the cylindrical member 100 may be reduced in diameter to the inner diameter dimension enabling the movement with respect to the shaft member (shaft 50) in the circumferential direction and in the axial direction. The cylindrical member 100 may have an inner diameter dimension set smaller than the part (intermediate part 53 of the shaft 50) where the inner peripheral surface (root portions 64) of the boot 60 is brought into contact. When the cylindrical member 100 is to be mounted to the part (intermediate part 53 of the shaft 50) where the inner peripheral surface (root portions 64) of the boot 60 is brought into contact, the cylindrical member 100 may be increased in diameter to the inner diameter dimension enabling the movement with respect to the shaft member (shaft 50) in the circumferential direction and in the axial direction. Therefore, the cylindrical member 100 has an extremely simple structure, thereby contributing to improvement in productivity and reduction of cost. Further, the slit 101 is not limited to have a straight shape extending along the axial direction, and may have various shapes as illustrated in FIG. 14B to FIG. 14F. As a result, a degree of freedom in design is high, and productivity is excellent.

The lubricant (grease) L sealed inside the joint is interposed between the inner peripheral surface of the cylindrical member 100 and the outer peripheral surface of the shaft member (shaft 50). Thus, the cylindrical member 100 can smoothly move on the shaft 50. Further, when the operating angle is taken, the root portions 64 of the boot 60 are brought into contact with the cylindrical member 100, and a force is applied to the cylindrical member 100. Thus, the cylindrical member 100 moves along with the movement of the root portions 64 of the boot 60 brought into contact with the cylindrical member 100. Therefore, relative movement does not occur between the root portions 64 and the cylindrical member 100, thereby preventing abrasion in the root portions 64.

As the boot 60, any existing (known and used in public) boot having hitherto been used for the constant velocity universal joint can be used. In this case, according to the present invention, even when the root portions 64 of the boot 60 are brought into contact with the cylindrical member 100, abrasion does not occur in the root portions 64 of the boot 60. Thus, there is no need to consider the abrasion resistance of the root portions, and the root diameter of the root portions 64 can be set smaller. Therefore, a compact design with a small boot outer diameter can be achieved. As described above, the material of the boot 60 is not limited, and various materials are applicable. Thus, materials utilizing the characteristic of the present application are applicable, such as materials which exhibit excellent fatigue resistance or thermal aging resistance even when the abrasion resistance is degraded as compared to that of the related-art materials. As a result, the number of options is increased.

The present invention is not limited to the above-mentioned embodiments. As a matter of course, various modifications can be made thereto within the range of not departing from the spirit of the present invention. The scope of the present invention is defined in claims, and encompasses equivalents described in claims and all changes within the scope of claims.

The present invention is applicable to fixed type constant velocity universal joints and plunging type constant velocity universal joints. It is effective for prevention of abrasion in the root portions 64 of the boot 60 when the fixed type constant velocity universal joint takes a large operating angle. Thus, the boot 60 can be compact. Even in the plunging type constant velocity universal joint, the peak and root diameters of the boot 60 can be designed to be extremely small. Thus, the boot 60 can be designed with compactness. In any specification, application of the present application is very effective.

INDUSTRIAL APPLICABILITY

The present invention is applicable to any constant velocity universal joints, such as fixed type constant velocity universal joints of a Rzeppa type, a birfield type, or the like capable of taking a high operating angle of $\theta=45$ degrees or higher through use of balls and plunging type constant velocity universal joints of a double offset type, a tripod type, a cross-groove type, or the like comprising a mechanism of sliding in the axial direction of the outer joint member. In the case of the tripod type, there may be employed a single roller type or a double roller type.

REFERENCE SIGNS LIST

10 outer joint member
20 inner joint member
30 torque transmission member (ball)
50 shaft member (shaft)
60 boot
80, 81 intermediate member (sliding bearing)
100 cylindrical member
101 slit

The invention claimed is:
1. A constant velocity universal joint, comprising:
an outer joint member having an opening portion at one end thereof;
an inner joint member configured to transmit torque while allowing angular displacement with respect to the outer joint member through a torque transmission member;
a boot closing the opening portion of the outer joint member, the boot having end portions which are fastened and fixed to a mounting part of the outer joint member and a mounting part of a shaft member extending from the inner joint member; and
an intermediate member configured to reduce abrasion due to friction caused by relative movement between an outer peripheral surface of the shaft member and an inner peripheral surface of the boot, the intermediate member being arranged at a part of the outer peripheral surface of the shaft member where at least the inner peripheral surface of the boot is brought into contact when the shaft member takes an operating angle with respect to the outer joint member,
wherein the inner peripheral surface of the boot slides with respect to an outer peripheral surface of the intermediate member, and an inner peripheral surface of the intermediate member slides with respect to the outer peripheral surface of the shaft member.

2. The constant velocity universal joint according to claim 1, wherein the intermediate member comprises a sliding bearing.

3. The constant velocity universal joint according to claim 1, wherein the intermediate member comprises a plurality of sliding bearings independently arranged next to each other along an axial direction.

4. The constant velocity universal joint according to claim 1,
wherein the intermediate member is formed of a cylindrical member configured to cover the outer peripheral surface of the shaft member, and
wherein the cylindrical member is movable with respect to the shaft member in a circumferential direction and in an axial direction.

5. The constant velocity universal joint according to claim 4, wherein the cylindrical member has an axial slit formed between both axial ends thereof.

6. The constant velocity universal joint according to claim 5,
wherein the cylindrical member is capable of being increased in diameter so that an inner diameter dimension is set larger than a maximum outer diameter dimension at an axial end part of the shaft member, and
wherein, when the cylindrical member is to be mounted to a part where the inner peripheral surface of the boot is brought into contact, the cylindrical member is reduced in diameter to an inner diameter dimension enabling movement with respect to the shaft member in the circumferential direction and in the axial direction.

7. The constant velocity universal joint according to claim 5,
wherein the cylindrical member is capable of being increased in diameter so that a width dimension of the axial slit in the circumferential direction is set larger than an outer diameter dimension at a part where the inner peripheral surface of the boot of the shaft member is brought into contact, and
wherein, when the cylindrical member is to be mounted to a part where the inner peripheral surface of the boot is brought into contact, the cylindrical member is reduced in diameter to an inner diameter dimension enabling movement with respect to the shaft member in the circumferential direction and in the axial direction.

8. The constant velocity universal joint according to claim 5,
wherein the cylindrical member has an inner diameter dimension smaller than a part of the shaft member where the inner peripheral surface of the boot is brought into contact, and
wherein, when the cylindrical member is to be mounted to a part of the shaft member where the inner peripheral surface of the boot is brought into contact, the cylindrical member is increased in diameter to an inner diameter dimension enabling movement with respect to the shaft member in the circumferential direction and in the axial direction.

9. The constant velocity universal joint according to claim 1, wherein a lubricant sealed inside the joint is interposed between the inner peripheral surface of the intermediate member and the outer peripheral surface of the shaft member.

10. The constant velocity universal joint according to claim 1, wherein a thickness dimension between the outer peripheral surface and the inner peripheral surface of the intermediate member is set from 0.01 mm to 1 mm.

11. The constant velocity universal joint according to claim 1,
wherein the intermediate member is formed of a cylindrical member configured to cover the outer peripheral surface of the shaft member, and
wherein the cylindrical member has a pair of end portions, which are configured to be joined to each other, that are formed along an axial direction of the cylindrical member at least at one location of the cylindrical member in a circumferential direction of the cylindrical member.

12. The constant velocity universal joint according to claim 11, wherein the cylindrical member comprises a plurality of sliding bearings independently arranged next to each other along the axial direction.

13. The constant velocity universal joint according to claim 11, wherein the cylindrical member is movable with respect to the shaft member in the circumferential direction and in the axial direction.

* * * * *